United States Patent
Lee et al.

(10) Patent No.: US 12,335,762 B2
(45) Date of Patent: Jun. 17, 2025

(54) ELECTRONIC DEVICE PERFORMING MEASUREMENT ON MEASUREMENT OBJECT OF INTER-RAT AND METHOD FOR OPERATING THE SAME

(71) Applicant: SAMSUNG ELECTRONICS CO., LTD., Suwon-si (KR)

(72) Inventors: Youngkwon Lee, Suwon-si (KR); Hyungjoon Yu, Suwon-si (KR); Insoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 498 days.

(21) Appl. No.: 17/662,563

(22) Filed: May 9, 2022

(65) Prior Publication Data

US 2023/0023678 A1    Jan. 26, 2023

Related U.S. Application Data

(63) Continuation of application No. PCT/KR2022/005695, filed on Apr. 21, 2022.

(30) Foreign Application Priority Data

Jul. 14, 2021  (KR) .................. 10-2021-0092105

(51) Int. Cl.
*H04W 24/10* (2009.01)
*H04W 24/08* (2009.01)
*H04W 36/14* (2009.01)

(52) U.S. Cl.
CPC .......... *H04W 24/10* (2013.01); *H04W 24/08* (2013.01); *H04W 36/144* (2023.05)

(58) Field of Classification Search
CPC .... H04W 24/10; H04W 24/08; H04W 36/144
See application file for complete search history.

(56) References Cited

U.S. PATENT DOCUMENTS

| 2010/0227639 A1 | 9/2010 | Kim et al. |
| 2017/0019852 A1 | 1/2017 | Yang |

(Continued)

FOREIGN PATENT DOCUMENTS

| CN | 110915252 A | 3/2020 |
| CN | 111757346 A | 10/2020 |

(Continued)

OTHER PUBLICATIONS

International Search Report dated Jul. 26, 2022 in connection with International Patent Application No. PCT/KR2022/005695, 2 pages.

(Continued)

*Primary Examiner* — Alex Skripnikov

(57) ABSTRACT

An electronic device may comprise a plurality of antennas, at least one processor, and an RF circuit. The at least one processor may be configured to identify at least one channel measurement configuration associated with a second RAT different from a first RAT in a state in which the electronic device is connected to a first communication network based on the first RAT, perform measurement on at least one measurement object identified based on at least some of the at least one channel measurement configuration, using at least one first antenna among the plurality of antennas, detect an event requiring a switch of an antenna for performing the measurement, and control the RF circuit to perform the measurement, using at least one second antenna different from the at least one first antenna among the plurality of antennas, based on detection of the event.

18 Claims, 20 Drawing Sheets

(56) References Cited

U.S. PATENT DOCUMENTS

| | | |
|---|---|---|
| 2018/0092000 A1 | 3/2018 | Kim et al. |
| 2019/0215743 A1 | 7/2019 | Liu |
| 2019/0253944 A1 | 8/2019 | Kim |
| 2019/0357065 A1 | 11/2019 | Cho et al. |
| 2020/0029237 A1 | 1/2020 | Kim et al. |
| 2020/0077312 A1 | 3/2020 | Tsuboi |
| 2020/0129718 A1 | 4/2020 | Ritz |
| 2020/0162953 A1 | 5/2020 | Kim |
| 2020/0374723 A1 | 11/2020 | Zheng |
| 2021/0120618 A1 | 4/2021 | Lee et al. |
| 2021/0212121 A1* | 7/2021 | Niu ............... H04W 24/10 |
| 2021/0400589 A1 | 12/2021 | Yiu |
| 2022/0038929 A1 | 2/2022 | Tsuboi |
| 2023/0067324 A1 | 3/2023 | Teyeb |

FOREIGN PATENT DOCUMENTS

| | | |
|---|---|---|
| JP | 2020129718 A | 8/2020 |
| KR | 10-1638911 B1 | 7/2016 |
| KR | 20180083262 A | 7/2018 |
| KR | 20200016253 A | 2/2020 |
| KR | 20200089317 A | 7/2020 |
| KR | 20200120456 A | 10/2020 |
| KR | 10-2021-0012810 A | 2/2021 |
| KR | 20210043733 A | 4/2021 |
| WO | 2016/167559 A1 | 10/2016 |
| WO | 2018/117313 A1 | 6/2018 |
| WO | 2018/174625 A1 | 9/2018 |
| WO | 2018/174676 A1 | 9/2018 |
| WO | WO-2022165773 A1 * | 8/2022 |

OTHER PUBLICATIONS

Written Opinion of the International Searching Authority dated Jul. 26, 2022 in connection with International Patent Application No. PCT/KR2022/005695, 4 pages.

* cited by examiner

ELECTRONIC DEVICE PERFORMING MEASUREMENT ON MEASUREMENT OBJECT OF INTER-RAT AND METHOD FOR OPERATING THE SAME

CROSS-REFERENCE TO RELATED APPLICATIONS

This application is a continuation application of International application No. PCT/KR2022/005695, filed on Apr. 21, 2022, which is based on and claims priority to Korean Patent Application 10-2021-0092105, filed Jul. 14, 2021, the disclosures of which are incorporated by reference herein in their entirety.

BACKGROUND

1. Field

Various embodiments relate to an electronic device performing measurement on a measurement object of inter-radio access technology (RAT) and a method for operating the same.

2. Description of Related Art

To implement 5G communication, stand-alone (SA) and non-standalone (NSA) schemes are taken into consideration. Of the two, the NSA scheme may include an E-UTRA NR dual connectivity (EN-DC) scheme that uses the new radio (NR) system along with the legacy LTE system. In the NSA scheme, UEs may use the gNBs of the 5th generation system (5GS) as well as the eNB of the evolved packet system (EPS). Technology allowing UEs to use heterogeneous communication systems may be termed dual connectivity. Dual connectivity has been first proposed in 3rd generation partnership project (3GPP) release-12 where a 3.5 GHz frequency band other than that for E-UTRA is used for small cells. The 5G EN-DC scheme may use an E-UTRA-based node as a master node and an NR-based node as a secondary node.

To add a secondary cell group (SCG) in a state connected to the cell of E-UTRA, the UE may perform measurement on a measurement object (MO) of inter-RAT, e.g., NR. A channel measurement configuration associated with measurement of inter-RAT (e.g., MeasConfig including at least one of measurement object, measurement identity, or reporting configuration) may be made based on the cell of E-UTRA. Accordingly, the UE may perform measurement on the measurement object of inter-RAT based on the channel measurement configuration. Further, the UE may also perform measurement on the measurement object of inter-RAT for inter-RAT handover.

To perform measurement on the measurement object of inter-RAT, the electronic device may perform measurement according to a period (e.g., measurement gap) set by the network. When measurement is performed, an element (e.g., at least one of a low-noise amplifier, a switch, or a sensor) of measurement of the electronic device may be activated.

SUMMARY

An electronic device may be implemented to perform measurement with a plurality of antennas for diversity. Accordingly, current consumption caused by the measurement by the plurality of antennas may be relatively high even in areas where SCG addition or inter-RAT handover is less likely. Or, if measurement is performed with only a minimum number of antennas to reduce current consumption, the likelihood that the B1 event reporting criterion associated with inter-RAT is to be triggered may decrease. Further, if the B1 event reporting criterion is triggered using the result of measurement using a diversity reception (DRX) antenna, the random access (RA) procedure using the primary reception (PRX) antenna may fail depending on a difference in communication environment between the plurality of antennas.

According to various embodiments, an electronic device and a method for operating the same may variably set an antenna for actual measurement among a plurality of antennas configured for measurement.

According to various embodiments, an electronic device may comprise a plurality of antennas, at least one processor, and an RF circuit configured to process an RF signal output from at least some of the plurality of antennas and provide the processed RF signal to the at least one processor. The at least one processor may be configured to identify at least one channel measurement configuration associated with a second RAT different from a first RAT in a state in which the electronic device is connected to a first communication network based on the first RAT, control the RF circuit to perform measurement on at least one measurement object identified based on at least some of the at least one channel measurement configuration, using at least one first antenna among the plurality of antennas, detect an event requiring a switch of an antenna for performing measurement on the at least one measurement object, and control the RF circuit to perform measurement on the at least one measurement object, using at least one second antenna at least partially different from the at least one first antenna among the plurality of antennas, based on detection of the event.

According to various embodiments, a method for operating an electronic device including a plurality of antennas may comprise identifying at least one channel measurement configuration associated with a second RAT different from a first RAT in a state in which the electronic device is connected to a first communication network based on the first RAT, performing measurement on at least one measurement object identified based on at least some of the at least one channel measurement configuration, using at least one first antenna among the plurality of antennas, detecting an event requiring a switch of an antenna for performing measurement on the at least one measurement object, and performing measurement on the at least one measurement object, using at least one second antenna at least partially different from the at least one first antenna among the plurality of antennas, based on detection of the event.

According to various embodiments, there may be provided an electronic device and a method for operating the same, which may variably set an antenna for actual measurement among a plurality of antennas configured for measurement. Accordingly, in areas where triggering of the B1 event reporting criterion is relatively less likely, a relatively small number of antennas may be used for measurement, thereby reducing current consumption. Or, in areas where the probability that the B1 event reporting criterion is to be triggered is relatively high, a relatively large number of antennas may be used for measurement, so that the probability that the likelihood of triggering of the B1 event reporting criterion may increase. Or, when the difference in measurement result between DRX antenna and PRX antenna is relatively large, it is possible to perform measurement using the PRX antenna, preventing unnecessary RA procedure attempts.

BRIEF DESCRIPTION OF THE DRAWINGS

For a more complete understanding of the present disclosure and its advantages, reference is now made to the following description taken in conjunction with the accompanying drawings, in which like reference numerals represent like parts, in which.

DETAILED DESCRIPTION

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
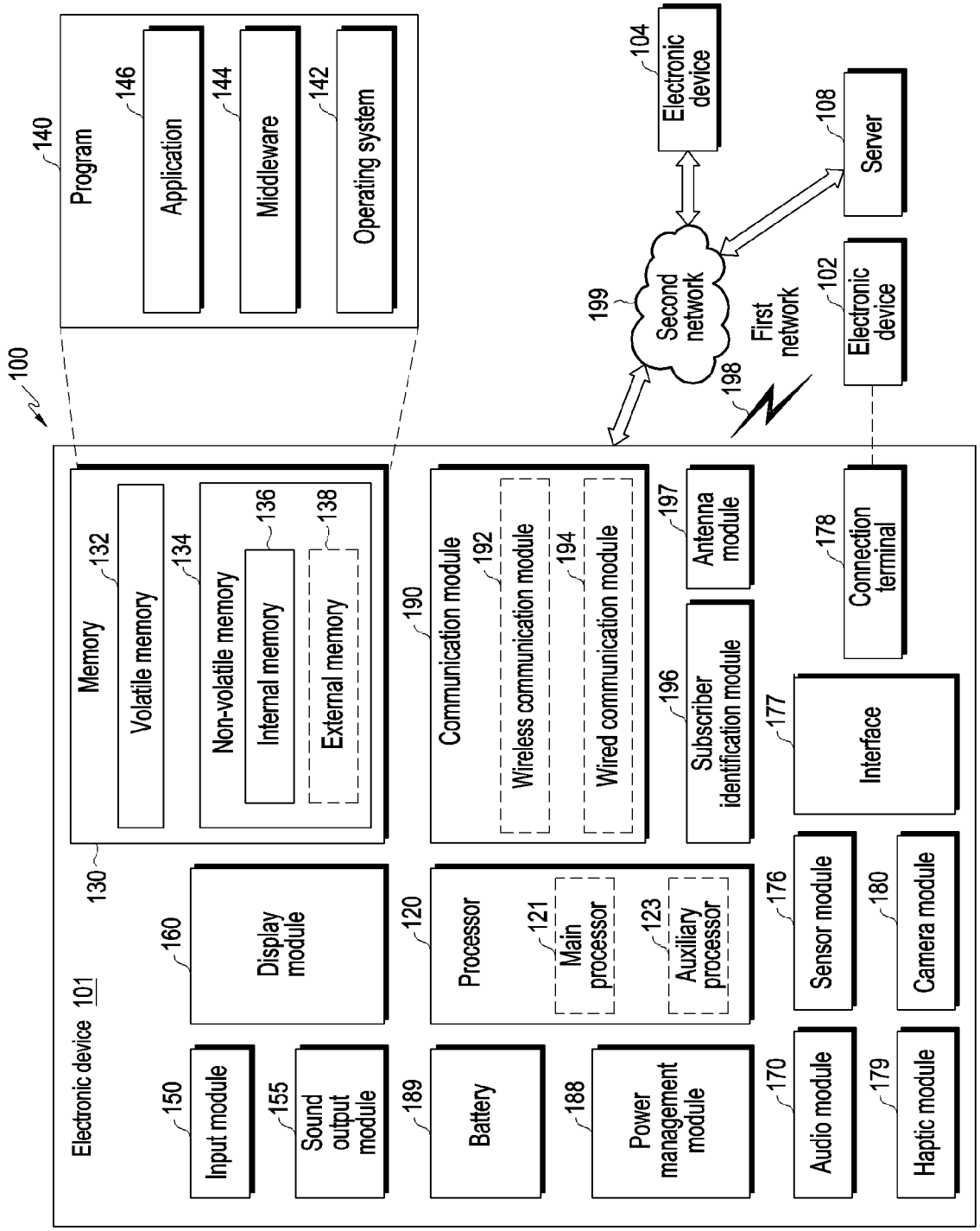
FIG. 1 is a view illustrating an electronic device in a network environment according to various embodiments of the present disclosure.

FIG. 1 is a block diagram illustrating an electronic device 101 in a network environment 100 according to various embodiments of the present disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
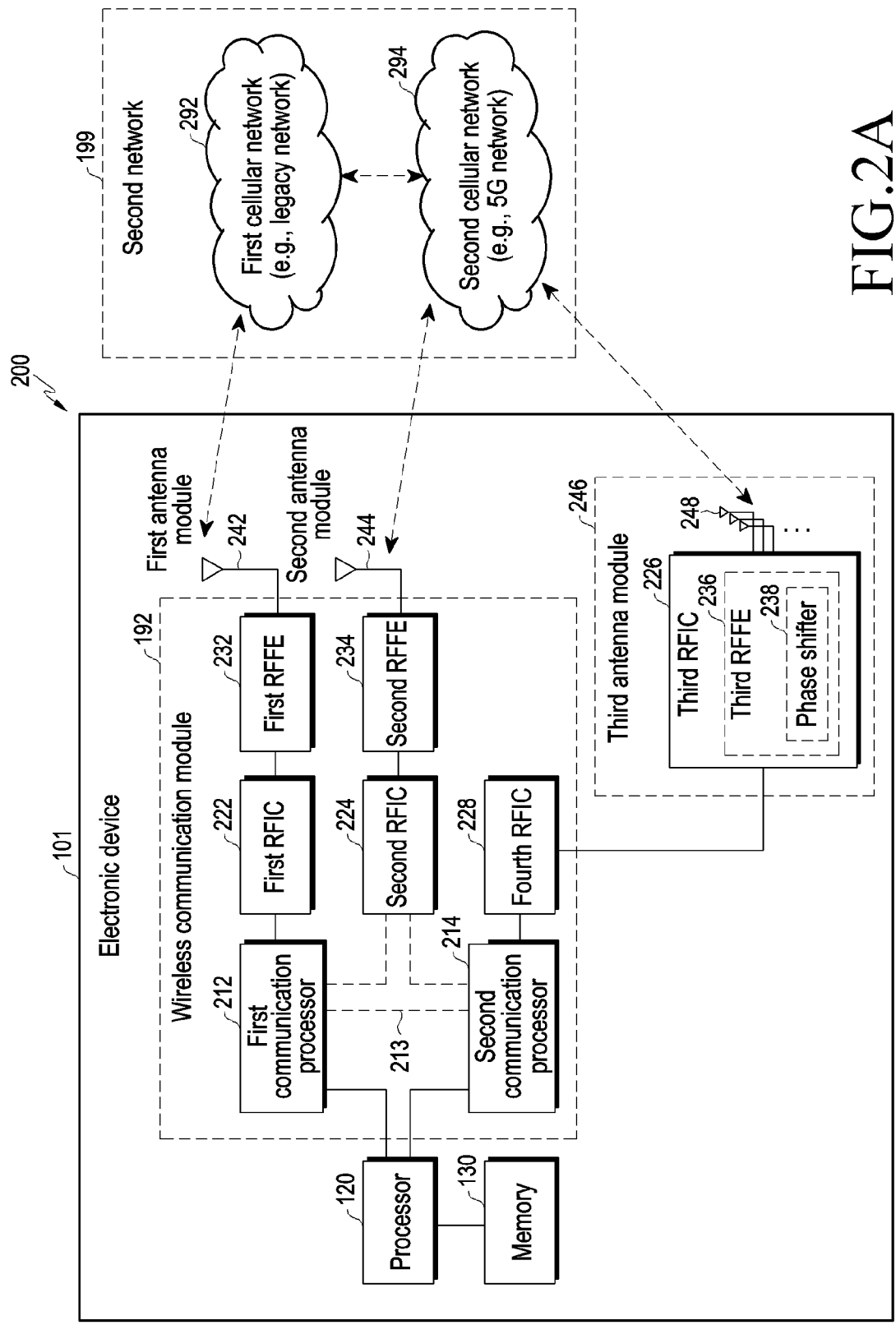
FIG. 2A is a block diagram illustrating an electronic device for supporting legacy network communication and 5G network communication according to various embodiments of the present disclosure.

FIG. 2A is a block diagram 200 illustrating an electronic device 101 for supporting legacy network communication and 5G network communication according to various embodiments of the present disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
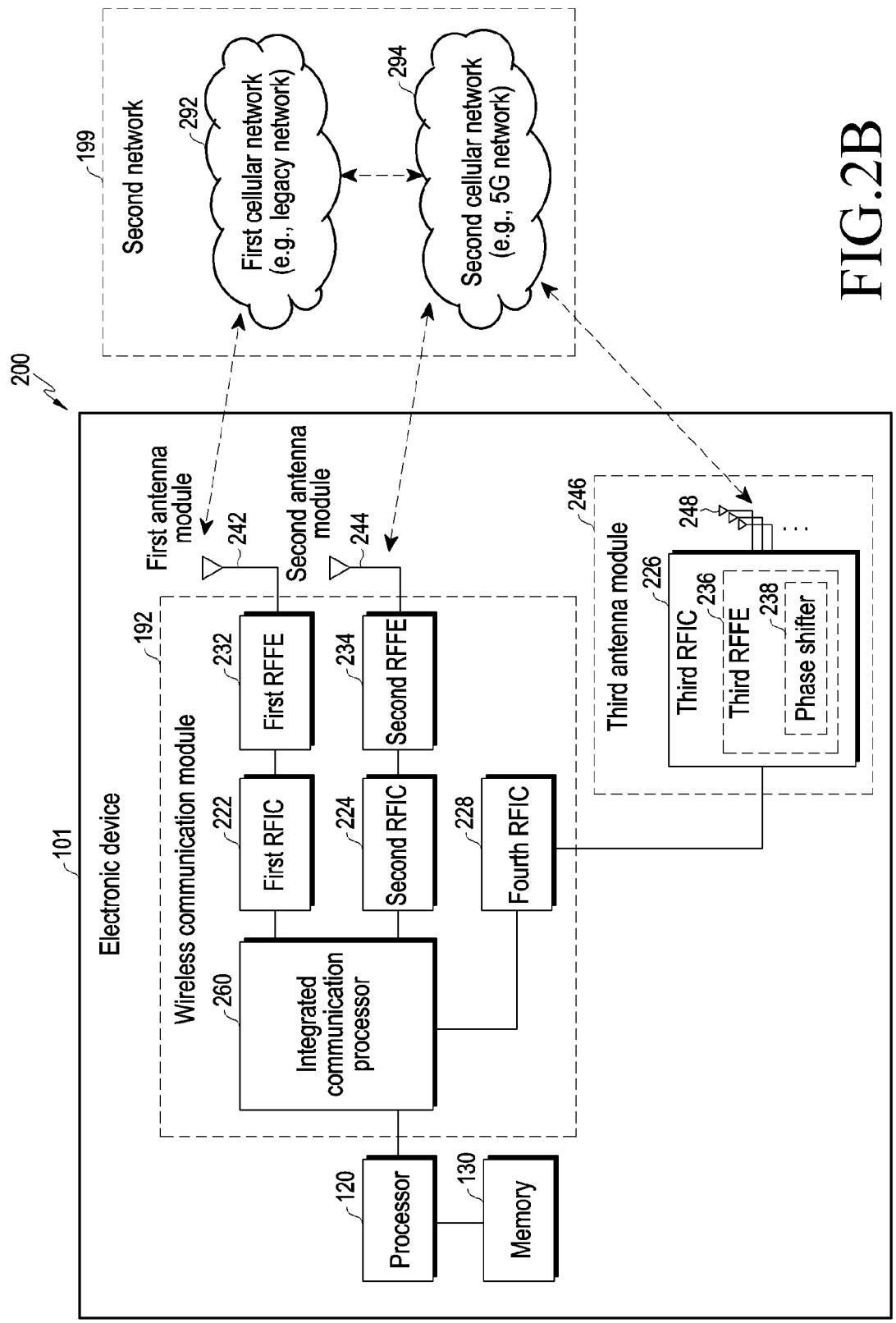
FIG. 2B is a block diagram illustrating an electronic device for supporting legacy network communication and 5G network communication according to various embodiments of the present disclosure.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, a communication processor 440 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert a baseband signal into a signal of a band supported by the first RFFE 232 and/or the second RFFE 234, and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
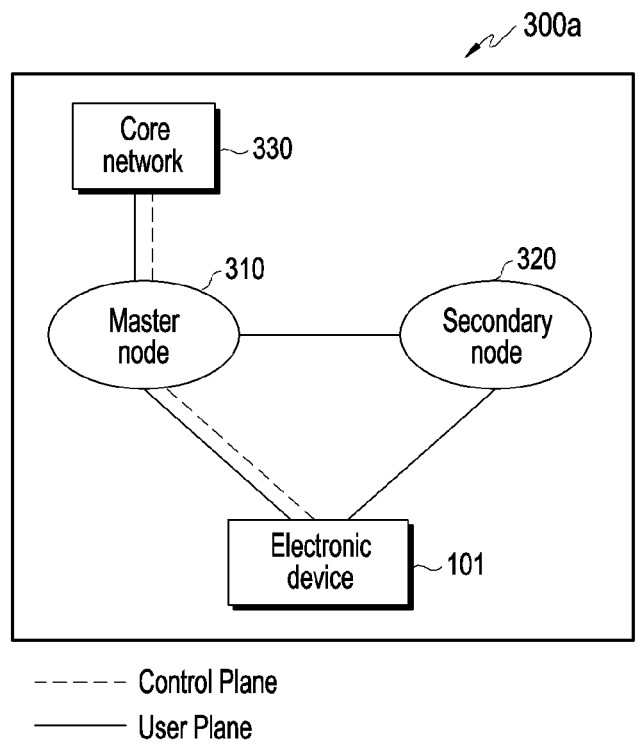
FIG. 3A is a view illustrating wireless communication systems providing a legacy communication network and/or a 5G communication network according to various embodiments of the present disclosure.
Figure 3B:
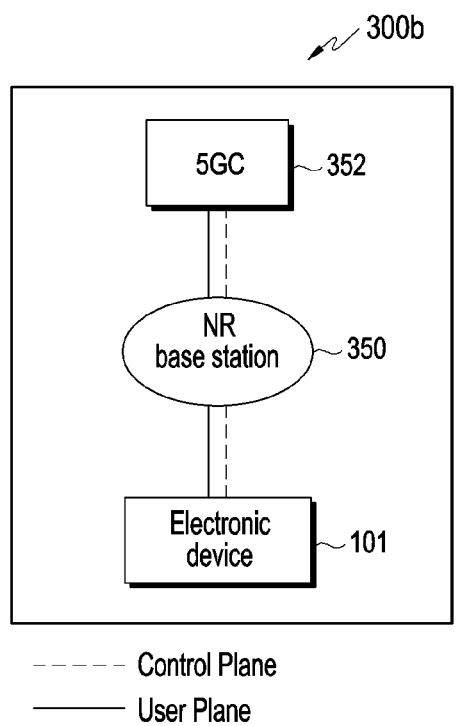
FIG. 3B is a view illustrating wireless communication systems providing a legacy communication network and/or a 5G communication network according to various embodiments of the present disclosure.
Figure 3C:
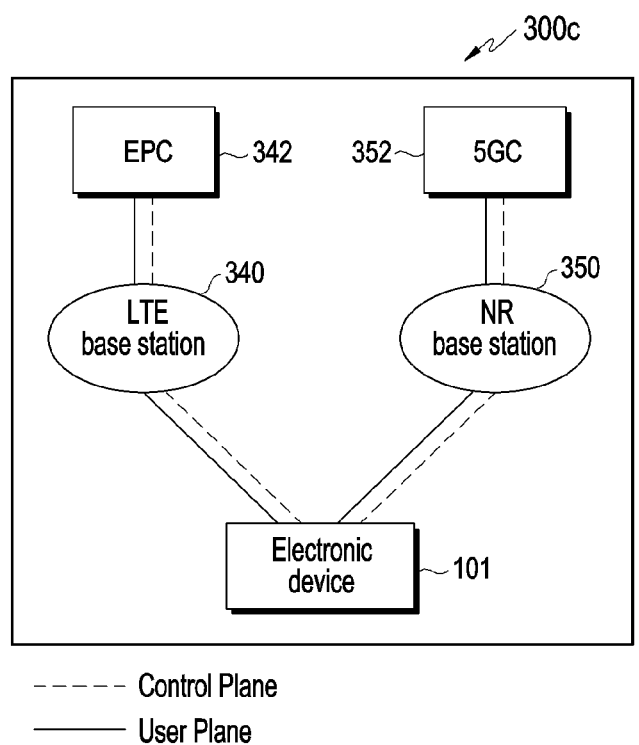
FIG. 3C is a view illustrating wireless communication systems providing a legacy communication network and/or a 5G communication network according to various embodiments of the present disclosure.

FIGS. 3A, 3B, and 3C are views illustrating wireless communication systems providing legacy communication and/or 5G communication networks according to various embodiments of the present disclosure. Referring to FIGS. 3A, 3B, and 3C, the network environment 301a to 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments, the network environment 300a may include a network environment that provides wireless communication dual connectivity (DC) to the LTE base station 340 and the NR base station 350 and transmits or receives control messages to/from the electronic device 101 via one core network 230 of the EPC 342 or the 5GC 352.

According to various embodiments, in the DC environment, one of the LTE base station 340 or the NR base station 350 may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment, the 5G network may include the NR base station 350 and the 5GC 352 and transmit or receive control messages and user data independently from the electronic device 101.

Referring to FIG. 3C, according to an embodiment, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

Figure 4A:
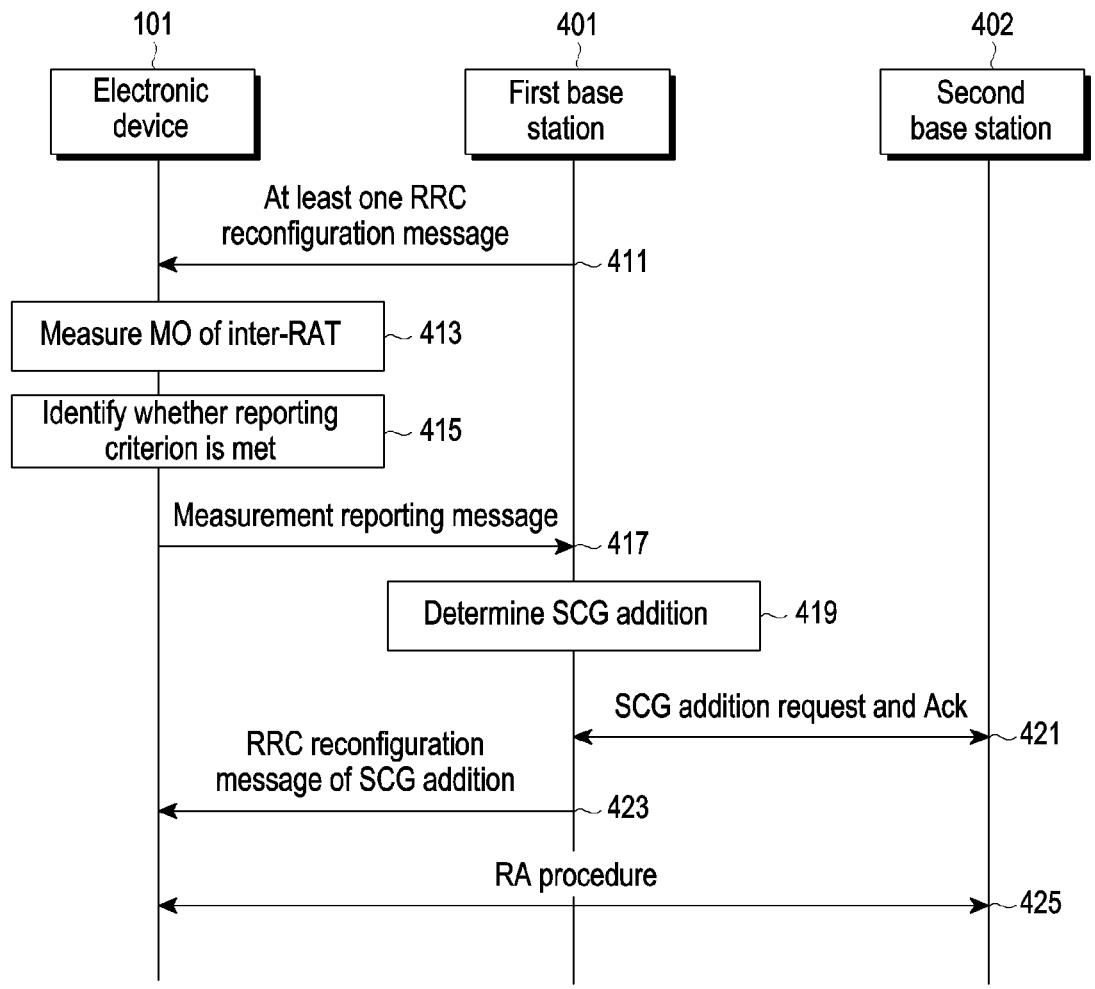
FIG. 4A is a flowchart illustrating an SCG addition process according to various embodiments of the present disclosure.

FIG. 4A is a flowchart illustrating an SCG addition process according to various embodiments of the present disclosure.

According to various embodiments, an electronic device 101 (e.g., at least one of the first communication processor 212, the second communication processor 214, or the integrated communication processor 260) may receive at least one RRC reconfiguration message (e.g., an RRC connection reconfiguration message of 3rd generation project partnership (3GPP) technical specification (TS) 36.331 or an RRC reconfiguration message of 3GPP TS 38.331) from a first base station 401 in operation 411. For example, the electronic device 101 may receive at least one RRC reconfiguration message in a state connected to the first base station 401 of a first RAT. Meanwhile, in a case where at least some of the functions are virtualized, the first base station 401 may be implemented as at least some of hardware of radio control and servers for performing the virtualized functions. The first base station 401 may be named a serving cell or anchor cell. When the electronic device 101 is in, e.g., an RRC connected state (RRC CONNECTED state), an RRC connection reconfiguration procedure may be performed. For example, if the RRC connection reconfiguration message includes a channel measurement configuration (e.g., measConfig of 3GPP TS 38.331 or 36.331), the electronic device 101 may perform a channel measurement configuration procedure (e.g., the measurement configuration procedure set forth in 3GPP TS 38.331 or 36.331). For example, the electronic device 101 may be requested to perform the following types of measurement:

intra-frequency measurement: measurement at downlink carrier frequency(ies) of serving cell(s);

inter-frequency measurement: measurement at frequencies different from any frequency among downlink carrier frequency(ies) of serving cell(s); and/or measurement in the frequency of inter-RAT (e.g., NR, UTRA, GERAN, CDMA 2000 HRPD or CDMA 2000 1×RTT).

The channel measurement configuration may include information about the measurement object. The measurement object may include, e.g., the subcarrier spacing and frequency/time positions of the reference signal to be measured. The electronic device 101 may identify the frequency for measurement based on the measurement object in the channel measurement configuration. The measurement object may also include information indicating a frequency to be measured (e.g., ARFCN-ValueEUTRA and/or ARFCN-ValueNR), a measurement object identity, or a blacklist and/or whitelist of cells. For example, the measurement object of inter-RAT may include an ARFCN-Value associated with the second RAT of a second base station 402.

According to an embodiment, the channel measurement configuration of the RRC connection reconfiguration message may include a reporting configuration. For example, the reporting configuration may include at least one of a reporting criterion, a reporting format, or an RS type, but not limited thereto. The reporting criterion is a condition to trigger the UE to transmit a measurement report and may be a periodic or single event description. For, e.g., LTE communication, the reporting format may be information about quantity and relevant information (e.g., the number of cells to be reported) that the UE includes in the measurement report. For, e.g., 5G communication, the reporting format may be per-cell and per-beam quantity and other related information (e.g., the maximum per-cell number and the maximum number of cells to be reported) that is to be included in the measurement report. The RS type may denote, e.g., the RS of the beam to be used by the UE and the measurement result.

According to an embodiment, the channel measurement configuration of the RRC connection reconfiguration message may include at least one of measurement identity, quantity configuration, or measurement gap. The measurement identity may be a list of measurement identities associated with the measurement object. The quantity configuration may define a measurement filtering configuration and periodic reporting of measurement used in all event evaluation and related reporting. The measurement gap may be the period when the UE perform measurement, e.g., an interval during which uplink or downlink transmission is not scheduled.

The electronic device 101 may perform measurement on at least one of a reference signal received power (RSRP), reference signal received quality (RSRQ), reference signal strength indicator (RSSI), or signal to interference-plus-noise ratio (SINR) corresponding to at least one of inter-frequency, intra-frequency, or inter-RAT according to the channel measurement configuration. "Electronic device 101 performs RSRP measurement" may mean that at least one of the processor 120, the first communication processor 212, the second communication processor 214, the integrated communication processor 260, or the integrated SoC (not shown) identifies the RSRP measurements, but not limited thereto. For example, the electronic device 101 may identify the linear average of power distributions (in watts (W)) of the resource element carrying at least one of the reference signal or synchronization signal in the frequency bandwidth to be measured, as the RSRP measurement. Meanwhile, the reference signal and the synchronization signal are not limited to specific signals but may be any signal defined in the 3GPP. For example, the electronic device 101 may identify the RSRP measurement based on the linear average of the power distributions at the reference point. For example, in the case of LTE communication, the electronic device 101 may identify the RSPR measurement based on the linear average of the power distributions at the antenna connector of the antenna (e.g., the first antenna module 242) receiving the communication signal. For example, in the case of FR1 of NR, the electronic device 101 may identify the RSPR measurement based on the linear average of the power distributions at the antenna connector of the antenna (e.g., the first antenna module 244) receiving the communication signal. For example, in the case of FR2 of NR, the electronic device 101 may identify a measurement (e.g., a synchronization signal-reference signal received power (SS-RSRP)) based on a combined signal from the antenna element (e.g., at least one antenna element of the antenna 248) corresponding to a given receiver branch. Although not shown, the electronic device 101 may include at least one sensor (e.g., at least one of a voltage sensor, a current sensor, or a power sensor) capable of measuring the power at the reference point (e.g., the antenna connector) and measure the power at the reference point based on the sensing data from at least one sensor. As described above, since the reference point is not limited to a specific one, no restriction is imposed on the position where at least one sensor is connected. According to an embodiment, "electronic device 101 performs RSRQ measurement" may mean that at least one of the processor 120, the first communication processor 212, the second communication processor 214, the integrated communication processor 260, or the integrated SoC (not shown) identifies the RSRQ measurements, but not limited thereto.

The electronic device 101 may identify that the measurement result meets the measurement condition. The electronic device 101 may identify the measurement result from the, e.g., the physical layer, and the electronic device 101 may determine whether the reporting criterion associated with the measurement object is met based on the measurement result. The electronic device 101 may perform filtering (e.g., layer 3 filtering) on the result and determine whether the reporting criterion is met based on the result of the filtering. According to an embodiment, "measurement result" may denote at least one of, e.g., a value obtained from the physical layer or a value resultant from filtering the value obtained from the physical layer. The reporting criteria associated with inter-RAT may include, but are not limited to, the following:

B1 event reporting criterion: Inter RAT neighbor becomes better than threshold; and/or B2 event reporting criterion: PCell becomes worse than threshold1 and inter-RAT neighbor becomes better than threshold2.

The above-enumerated reporting criteria may follow, e.g., 3GPP TS 36.331 or 3GPP TS 38.331 but are not limited to a specific kind.

According to various embodiments, in operation 413, the electronic device 101 may perform measurement on the measurement object of inter-RAT. For example, the electronic device 101 may perform measurement based on a signal (e.g., a synchronization signal and/or a reference signal) from the second base station 402. In operation 415, the electronic device 101 may identify whether the measurement result meets the reporting criterion. Based on the reporting criterion being met, the electronic device 101 may transmit a measurement reporting message to the first base station 401 in operation 417. For example, the electronic device 101 may transmit the measurement reporting message to the network 300 if the met reporting criterion, e.g., the B1 event reporting criterion, among the above-described reporting criteria is maintained during a time-to-trigger. When the entering condition of the B1 event reporting criterion is met and, during the time-to-trigger, the leaving condition is not met, the electronic device 101 may determine that the reporting criterion is met. For the measurement reporting process-triggered measurement identity, the electronic device 101 may configure the measurement result (e.g., measResults of 3GPP TS 38.331 or 3GPP TS 36.331) in the measurement report message. The information element (IE) of the measurement result may include the measurement result (e.g., at least one of RSRP, RSRQ, or SINR) for intra-frequency, inter-frequency, and inter-RAT mobility. For example, the measurement reporting message may include a measurement identity and a measurement result and, in the embodiment of FIG. 4A, the measurement identity is assumed to be associated with the second base station 402.

According to various embodiments, in operation 419, the first base station 401 may determine SCG addition for the second base station 402 based on information about the measurement reporting message. If it is determined to add an SCG, the first base station 401 may exchange an SCG addition request and an Ack with the second base station 402 in operation 421. In operation 423, the first base station 401 may transmit an RRC reconfiguration message having a configuration of SCG addition to the electronic device 101. In operation 425, the electronic device 101 may perform an RA procedure with the second base station 402 based on the configuration of SCG addition of the RRC reconfiguration message. For example, the electronic device 101 may perform at least one of transmission of an RA preamble message, reception of a random access response (RAR), transmission of an RRC connection request message, reception of an RRC connection setup message, and transmission of an RRC connection setup complete message, but the RA procedure is not limited thereto.

Figure 4B:
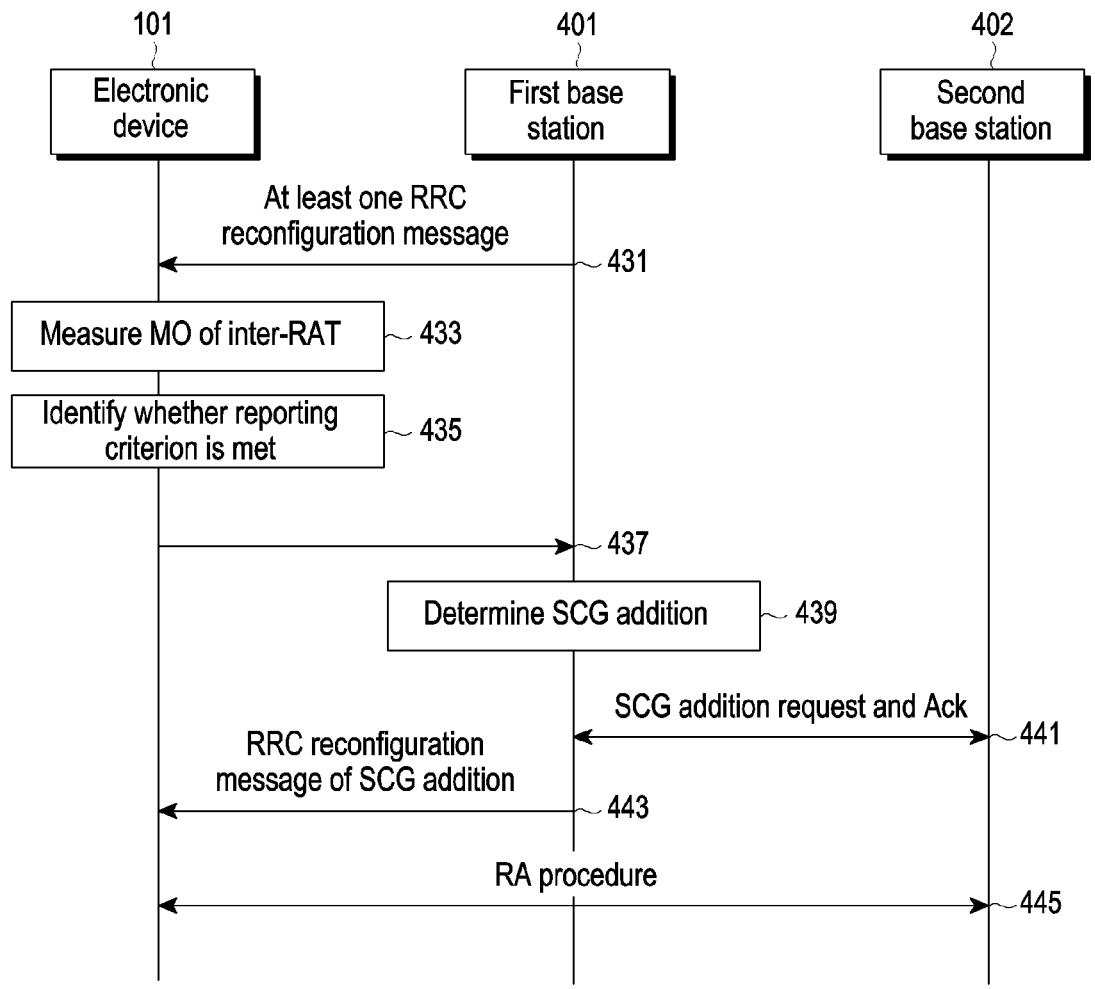
FIG. 4B is a flowchart illustrating an inter-RAT handover process according to various embodiments of the present disclosure.

FIG. 4B is a flowchart illustrating an inter-RAT handover process according to various embodiments of the present disclosure.

According to various embodiments, in operation 431, the electronic device 101 may receive at least one RRC message from the first base station 401. In operation 433, the electronic device 101 may perform measurement on the identified measurement object of inter-RAT based on the at least one RRC message. In operation 435, the electronic device 101 may identify whether the measurement result meets the reporting criterion corresponding to the measurement object. For example, the electronic device 101 may identify that the B1 event reporting criterion is met. In operation 437, the electronic device 101 may transmit a measurement reporting message to the first base station 401.

According to various embodiments, in operation 439, the first base station 401 may determine handover to the second base station 402. The first base station 401 and the second base station 402 may exchange a handover request message and an ack message in operation 441. In operation 443, the first base station 401 may transmit a handover command message, which indicates that the second base station 402 is the target cell, to the electronic device 101. In operation 445, the electronic device 101 may perform an RA procedure with the second base station 402 based on reception of the handover command message.

As described above, the electronic device 101 may perform measurement for SCG addition of MR-DC as in operation 413 of FIG. 4A or measurement of inter-RAT handover as in operation 433 of FIG. 4B. The electronic device 101 may activate an element (or component or hardware) for measurement according to the measurement gap and identify the reception strength in the measurement object, which is described below with reference to FIG. 5.

Figure 5:
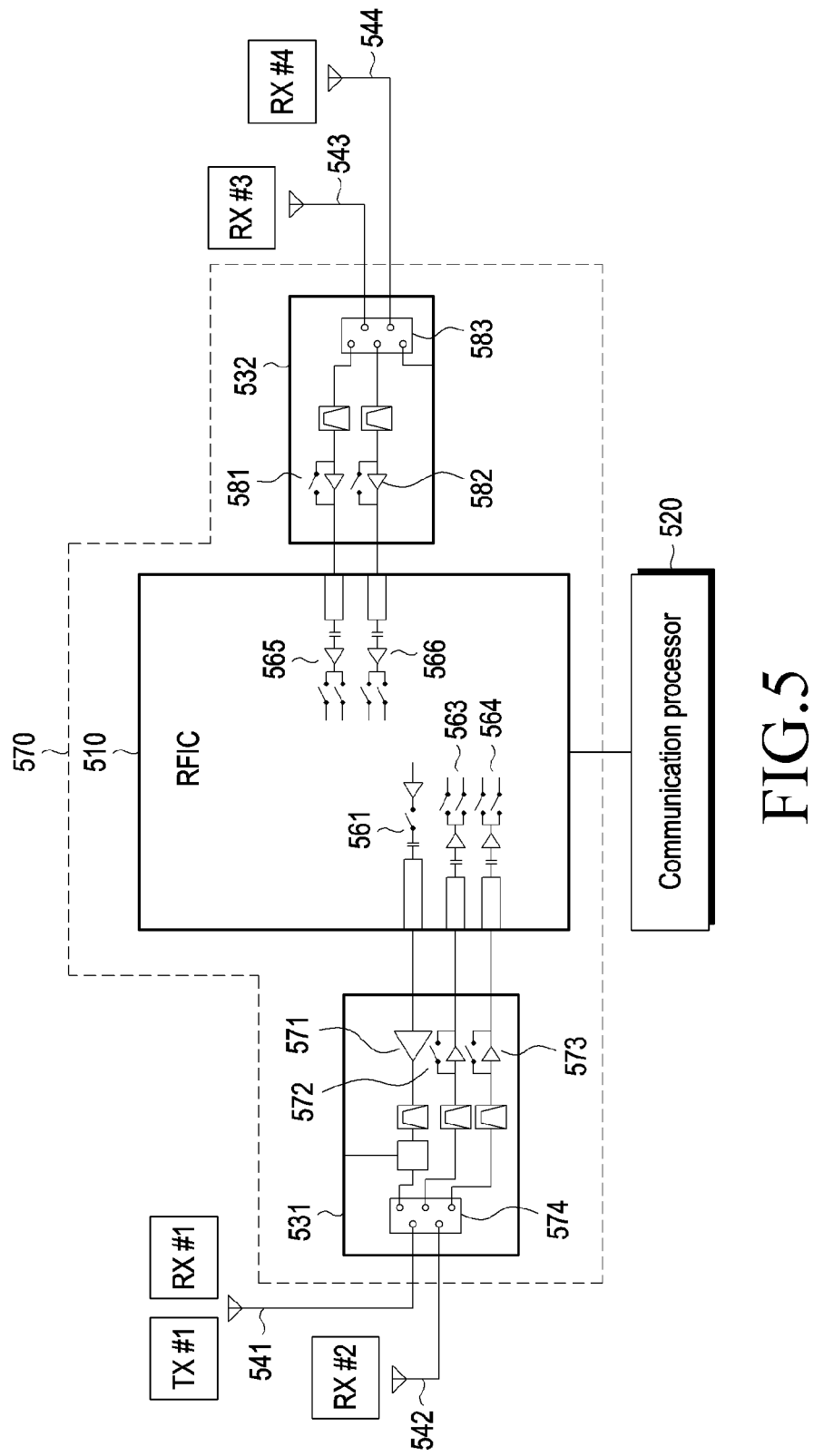
FIG. 5 is a block diagram illustrating an electronic device according to various embodiments of the present disclosure.

FIG. 5 is a block diagram illustrating an electronic device according to various embodiments of the present disclosure.

According to various embodiments, an electronic device (e.g., the electronic device 101 of FIG. 1) may include a communication processor 520 (e.g., at least one of the first communication processor 212, the second communication processor 214, or the integrated communication processor 260), an RFIC 510 (e.g., at least one of the first RFIC 222, the second RFIC 224, the third RFIC 226, or the fourth RFIC 228), a first RFFE 531, a second RFFE 532, a first antenna 541, a second antenna 542, a third antenna 543, and a fourth antenna 544. Here, at least one of the RFIC 510, the first RFFE 531, or the second RFFE 532 may be referred to as an RF circuit 570. The communication processor 520 may control at least some of the RFIC 510 or RFFEs 531 and 532 to change an antenna for measurement.

According to various embodiments, upon transmission, the RFIC 510 may convert a baseband signal generated by the communication processor 520 into a radio frequency (RF) signal. For example, the RFIC 510 may transmit an RF signal to the first antenna 541 through the first RFFE 531. Alternatively, upon reception, the RFIC 510 may convert the RF signal received from an RFFE (e.g., the first RFFE 531 or the second RFFE 532) into a baseband signal and provide the baseband signal to the communication processor 520. The RFIC 510 may include a component 561 for transmission and components 563, 564,565, and 566 for reception. The first RFFE 531 may include a component 571 for transmission, components 572 and 573 for reception, and a switch 574. The switch 574 may control the connection between each of the components 571, 572, and 573 and each of the antennas 541 and 542. The second RFFE 532 may include components 581 and 582 for reception and a switch 583. The switch 583 may control the connection between each of the components 581 and 582 and each of the antennas 543 and 544. Here, the first antenna 541 may be used for both transmission and reception, and may be named a PRX antenna. The second antenna 542, the third antenna 543, and the fourth antenna 544 may be used for reception, and may be named a DRX antenna, respectively.

For example, when the number of antennas for measurement is set to four, the communication processor 520 may control at least some of the RFIC 510 and the RFFEs 531 and 532 to allow communication to be performed through entire antennas in the first antenna 541, the second antenna 542, the third antenna 543, and the fourth antenna 544. The communication processor 520 may perform an operation for adjusting the antenna for reception based on identification of an event requiring a change of the antenna for measurement. For example, the communication processor 520 may adjust the antenna for reception to the first antenna 541. In this case, the communication processor 520 may control the RFIC 510 and the second RFFE 532 to disable a measurement operation through the second antenna 542, the third antenna 543, and the fourth antenna 544. In this case, at least some of the components 564, 565, 566, 573, 581, and 582 may be controlled so that no signal is received from the antennas 542, 543, and 544. Meanwhile, there is no limitation to configuring an antenna for measurement. For example, the communication processor 520 may control the switch 574 to connect the component 572 to the first antenna 541. The LNA in the component 572 may low-noise amplify the RF signal from the first antenna 541 and provide the low-noise amplified RF signal to the RFIC 510. Meanwhile, the communication processor 520 may control the switch 574 such that the second antenna 542 is not connected to the component 573, and the component 573 may not be activated (or allowed to remain in the inactive state). For example, the communication processor 520 may control the switch 583 such that the third antenna 543 is not connected to the component 581, and the component 581 may not be activated (or allowed to remain in the inactive state). For example, the communication processor 520 may control the switch 583 such that the fourth antenna 544 is not connected to the component 582, and the component 582 may not be activated (or allowed to remain in the inactive state).

Figure 6:
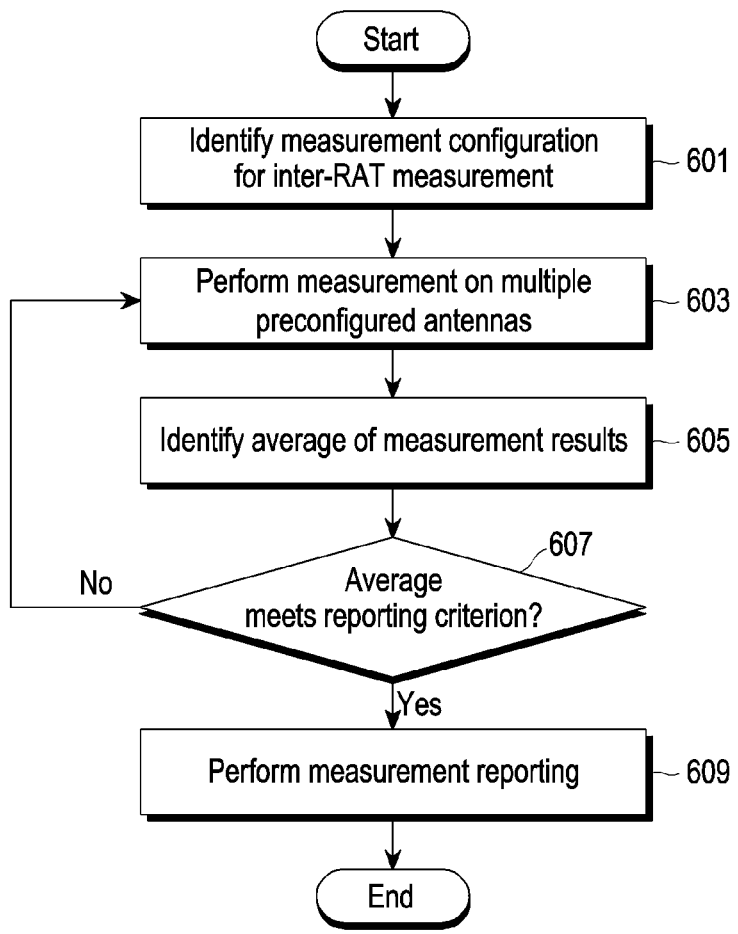
FIG. 6 is a block diagram illustrating an electronic device according to a comparative example for comparison with various embodiments of the present disclosure.

FIG. 6 is a block diagram illustrating an electronic device according to a comparative example for comparison with various embodiments of the present disclosure. At least some of the operations of the electronic device 101 according to the comparative example may also be performed by the electronic device according to various embodiments.

According to the comparative example, in operation 601, the electronic device 101 may identify a channel measurement configuration for inter-RAT measurement. As described above, the electronic device 101 may identify the channel measurement configuration for inter-RAT measurement based on at least one RRC reconfiguration message received from the network. In operation 603, measurement may be performed on a plurality of preconfigured antennas. For example, the plurality of antennas 541, 542, 543, and 544 of FIG. 5 are assumed to be the preconfigured antennas for measurement. The electronic device 101 may measure a reception strength (e.g., RSRP) corresponding to each of the plurality of antennas 541, 542, 543, and 544.

According to the comparative example, in operation 605, the electronic device 101 may identify an average of measurement results corresponding to the plurality of antennas 541, 542, 543, and 544, respectively. The electronic device 101 may determine whether the average meets the reporting criterion in operation 607. If the average does not meet the reporting criterion (No in 607), the electronic device 101 may repeatedly perform measurement. If the average meets the reporting criterion (Yes in 607), the electronic device 101 may perform measurement reporting in operation 609. Table 1 is an example of RSRP measured in four antennas 541, 542, 543, and 544.

TABLE 1

| | Antenna | | | |
|---|---|---|---|---|
| | antenna 541 | antenna 542 | antenna 543 | antenna 544 |
| RSRP(dBm) | −114 | −112 | −104 | −118 |

In the comparative example, the electronic device 101 may identify that an average of measurement results corresponding to the antennas 541, 542, 543, and 544, respectively, is −112 dBm. Meanwhile, it is assumed that the entering condition of the reporting criterion of B1 event is set to a measurement result of −110 dBm or more. Here, −110 dBm may be a value that may be set by the network and may be set by at least one parameter (e.g., Ofn, Ocn, Hys, Thresh, or Mn) defined in the B1 event reporting criterion of 3GPP TS 36.331 or 3GPP TS 38.331 but is not limited thereto. If the electronic device 101 uses −104 dBm which is the RSRP of the third antenna 543, it may be determined that the entering condition of the B1 event is met. However, as the electronic device 101 uses −112 dBm, which is the average, as the RSRP, it may be determined that the entering condition of the B1 event is not met. If measurement using the plurality of antennas 541, 542, 543, and 544 is performed in an area where the RSRP is relatively low, unnecessary power consumption may occur. Or, in another comparative example, the electronic device 101 may determine that the B1 event is met using the maximum value (e.g., −104 dBm) among the measurement results. However, the communication environment of the first antenna 541, which is a PRX antenna, may be relatively poor and, in this case, there may exist a likelihood that an attempt of RA using the first antenna 541, which is a PRX antenna, fails. Accordingly, it is required to configure an antenna for measurement adaptively depending on the current state of the electronic device 101, rather than fixing an antenna for measurement.

Figure 7A:
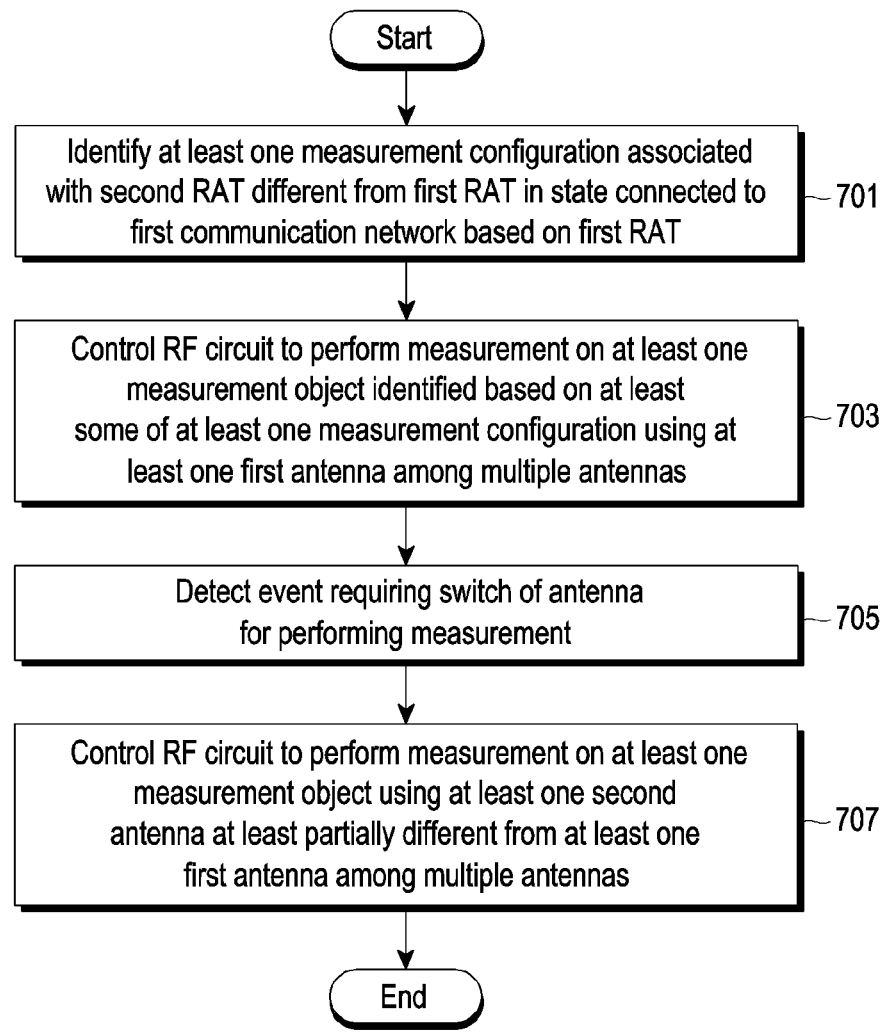
FIG. 7A is a flowchart illustrating an operation method of an electronic device according to various embodiments of the present disclosure.

FIG. 7A is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may identify at least one channel measurement configuration associated with a second RAT different from a first RAT in a state connected to a first communication network based on the first RAT in operation 701. For example, the electronic device 101 may identify at least one movement control module associated with inter-RAT, e.g., the second RAT, based on at least one RRC reconfiguration message received from the network. The channel measurement configuration may include at least one of, e.g., a measurement object, a reporting criterion associated with the measurement object, or measurement identification information for associating the measurement object with the reporting criterion.

According to various embodiments, in operation 703, the electronic device 101 may control an RF circuit (e.g., the RF circuit 570 of FIG. 5) to perform measurement on at least one measurement object identified based on at least some of at least one channel measurement configuration using at least one first antenna among a plurality of antennas 541, 542, 543, and 544. For example, the at least one first antenna may be all or some of the plurality of antennas 541, 542, 543, and 544, and combinations of the at least one first antenna are not limited to a specific one. The electronic device 101 may control the RF circuit (e.g., the RF circuit 570 of FIG. 5) not to perform measurement on the other antennas than at least one first antenna. If the first antenna 541 among the plurality of antennas 541, 542, 543, and 544 is set as the at least one first antenna, the electronic device 101 may control the RF circuit 570 so that the components 564, 565, 566, 573, 574, 581, 582, and 583 related to the other antennas 542, 543, and 544 are not operated so as not to perform measurement on the antennas 542, 543, and 544. If entire antennas in the plurality of antennas 541, 542, 543, and 544 are set as at least one first antenna, the electronic device 101 may control the RF circuit 570 to activate all of the components for reception.

According to various embodiments, in operation 705, the electronic device 101 may detect an event in which a change of the antenna for performing measurement is required. Various types of events are described below. Based on the detection of the event, the electronic device 101 may control the RF circuit 570 to perform measurement on at least one measurement object using at least one second antenna at least partially different from at least one first antenna among the plurality of antennas 541, 542, 543, and 544 in operation 707. Here, 'at least one second antenna at least partially different from at least one first antenna' may mean that they include some identical antennas if the at least one second antenna and the at least one first antenna are not completely identical. For example, the electronic device 101 may perform measurement using one antenna (e.g., the first antenna 541) and, based on identification of an event, perform measurement using entire antennas in the plurality of antennas 541, 542, 543, and 544. Alternatively, the electronic device 101 may perform measurement using entire antennas in the plurality of antennas 541, 542, 543, and 544 and, based on identification of an event, perform measurement using one antenna (e.g., the first antenna 541). There is no limitation to combinations of antennas before and after the identification of the event. The electronic device 101 may control the RF circuit (e.g., the RF circuit 570 of FIG. 5) not to perform measurement on the other antennas than at least one second antenna. If the first antenna 541 among the plurality of antennas 541, 542, 543, and 544 is set as the at least one second antenna, the electronic device 101 may perform control not to perform measurement on the remaining antennas 542, 543, and 544. For example, the electronic device 101 may control the RF circuit 570 so that the components 564, 565, 566, 573, 581, and 582 related to the remaining antennas 542, 543, and 544 are not operated and/or may control the switches 574 and 583 so that the remaining antennas 542, 543, and 544 are not connected to the components 573, 581, and 582. If the plurality of antennas 541, 542, 543, and 544 are set as at least one second antenna, the electronic device 101 may control the RF circuit 570 to activate all of the components for reception.

As is described below, e.g., when the reception strength is relatively low, the probability that the reporting criterion of the B1 event is to be triggered is relatively low. Thus, it is necessary to reduce the amount of consumed current. In this case, the electronic device 101 may perform measurement using a relatively small number of antennas. The electronic device 101 may use the first antenna 541 which is a PRX antenna, but there is no limitation. As is described below, e.g., when the possibility of RA failure is relatively high, it is necessary to reduce the amount of current consumed, and the electronic device 101 may perform measurement using a relatively small number of antennas. As is described below, e.g., when the probability that the reporting criterion of the B1 event is to be triggered is relatively high, it is possible to increase the probability of triggering the reporting criterion of the B1 event by using a relatively larger number of antennas for measurement.

In one example, the electronic device 101 may be implemented to be switched between, e.g., two or more antenna modes (e.g., a first mode or a second mode). Alternatively, as another example, the electronic device 101 may be implemented to select an antenna for measurement from among the plurality of antennas based on the current state. As the current state is changed, the electronic device 101 may select an antenna for measurement different from the existing one, so that the antenna for measurement may be changed.

Figure 7B:
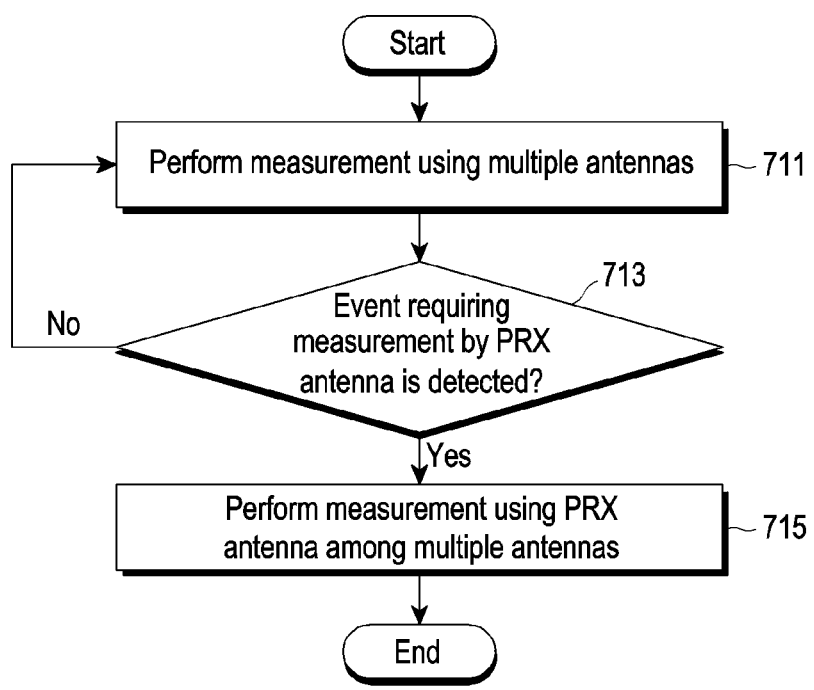
FIG. 7B is a flowchart illustrating an operation method of an electronic device according to various embodiments of the present disclosure.

FIG. 7B is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may perform measurement using all (or some) of a plurality of antennas (e.g., the plurality of antennas 541, 542, 543, and 544) corresponding to a measurement object (or frequency band) in operation 711. In one example, if four antennas 541, 542, 543, and 544 corresponding to 4RX are set correspond to a specific measurement object (or a specific frequency band), the electronic device 101 may perform measurement using entire antennas in the corresponding antennas 541, 542, 543, and 544. However, performing measurement using entire antennas in the antennas 541, 542, 543, and 544 is an example, and the number of antennas for performing measurement is not limited. For example, the electronic device 101 may perform measurement in the first mode. As an example of the first mode, measurement may be performed using entire antennas in the antennas for performing the measurement, but as described above, the number is not limited. For example, the electronic device 101 may set the first mode as a default mode. Alternatively, the electronic device 101 may switch to the first mode before performing operation 711. An event for switching to the first mode is described below with reference to FIG. 7C.

According to various embodiments, in operation 713, the electronic device 101 may determine whether an event where measurement by one antenna of PRX antenna is required is detected. If the event is not detected (No in 713), the electronic device 101 may perform measurement using all (or some) of the plurality of antennas in the first mode. If the event is detected (Yes in 713), the electronic device 101 may perform measurement using the PRX antenna (e.g., the first antenna 541 of FIG. 5) among the plurality of antennas in operation 715. The antenna mode in which measurement is performed using one antenna may be referred to as a second mode. However, the second mode performing measurement using one PRX antenna is merely an example, and it will be appreciated by one of ordinary skill in the art that there is no limitation to the second mode if the number of antennas used for measurement is smaller in the second mode than the first mode. If there are a plurality of PRX antennas, the electronic device 101 may perform measurement using the plurality of PRX antennas in the second mode. Or, the electronic device 101 may perform measurement using one or more DRX antennas and one or more PRX antennas in the second mode. When the measurement result using the PRX antenna meets a reporting criterion (e.g., the reporting criterion of the B1 event), the electronic device 101 may perform measurement reporting.

In one example, the electronic device 101 may identify whether an event requiring a switch to the second mode occurs based on measurement results using the plurality of antennas based on the first mode. For example, the electronic device 101 may identify the maximum value among the measurement results using the plurality of antennas. The electronic device 101 may determine that the event occurs based on identifying that the maximum value (or a value resultant from setting the offsets set under the reporting criterion of the B1 event to the maximum value) is less than a first threshold. For example, the first threshold may be set based on a threshold set for the reporting criterion of the B1 event. For example, the entering condition of the reporting criterion of the B1 event may be expressed as in Equation 1.

$$Mn + Ofn + Ocn - Hys > \text{Thresh} \quad \text{[Equation 1]}$$

In Equation 1, Mn may be the measurement result of the inter-RAT neighbor cell. Ofn may be the measurement object-specific offset of the frequency of the inter-RAT neighbor cell. Ocn may be the cell-specific offset of the inter-RAT neighbor cell. Hys may be the hysteresis parameter for the reporting criterion of the B1 event. Thresh may be the threshold parameter for the reporting criterion of the B1 event. For example, if Equation 2 is met, the electronic device 101 may switch to the second mode.

$$Mn(\text{maximum value}) < \text{Thresh-margin} \quad \text{[Equation 2]}$$

Here, Mn (maximum value) may mean the maximum value among the measurement results for the plurality of antennas. Thresh may be the threshold parameter in Equation 1. Margin is a value that may be determined experimentally, and may be a fixed value but, may be variable according to implementation. Alternatively, the electronic device 101 may switch to the second mode when the result of applying the offsets Ofn, Ocn, and Hys to Mn (maximum value) is smaller than Threshold-margin. Accordingly, while the probability that the reporting criterion of the B1 event is to be triggered is relatively low, the electronic device 101 may switch from the first mode to the second mode so that current consumption may decrease.

In one example, the electronic device 101 may identify whether an event requiring a switch to the second mode occurs based on measurement results using the plurality of antennas based on the first mode during a designated period. For example, the electronic device 101 may identify the maximum value among the measurement results using the plurality of antennas during the designated period. The electronic device 101 may determine that the event occurs based on identifying that the maximum value (or a value resultant from setting the offsets set under the reporting criterion of the B1 event to the maximum value) is less than a first threshold. Since the first threshold has been described above, no further detailed description thereof is given below.

In one embodiment, the electronic device 101 may perform measurement reporting based on the first mode-based measurement result. Based on reception of an RRC reconfiguration message from the network according to measurement reporting, the electronic device 101 may attempt an RA procedure for SCG addition or an RA procedure for inter-RAT handover. However, in some cases, the RA procedure may fail. The electronic device 101 may determine that the event occurs based on identifying the failure of the RA procedure. Since the failure of the RA procedure may mean that SCG addition or inter-RAT handover may continuously fail, the electronic device 101 may reduce power consumption by operating in the second mode. In one example, the electronic device 101 may determine that the event occurs based on the number of failures of the RA procedure being equal to or larger than a threshold number.

In one example, the electronic device 101 may identify the first mode-based measurement result. The electronic device 101 may determine that the event occurs based on identifying that the measurement result in the PRX antenna and the measurement result in the DRX antenna meet a designated condition. When the measurement result in the PRX antenna is a threshold or more smaller than the maximum value of the measurement results of the DRX antennas, the electronic device 101 may determine that the event occurs. A low measurement result of PRX antenna may mean that the electric field of the PRX antenna is poor and may mean that the probability of failure of the RA procedure using the PRX antenna is relatively high. Accordingly, since the probability of failure in RA procedure is high, the electronic device 101 may reduce current consumption as it operates in the second mode. This may be attributed to channel reciprocity between downlink channel and uplink channel of the PRX antenna. When downlink and uplink are TDD, the electronic device 101 may operate according to the instant example, but not is limited thereto, and the instant example is also applicable to FDD.

In one embodiment, the electronic device 101 may perform measurement reporting based on the first mode-based measurement result. According to measurement reporting, the electronic device 101 may receive an RRC reconfiguration message from the network. The electronic device 101 may identify the base station to transmit an RA preamble message based on the RRC reconfiguration message. Further, the electronic device 101 may identify the magnitude of transmit power (e.g., PRACH) for transmitting the RA preamble message. The electronic device 101 may determine that the event occurs when the magnitude of transmit power exceeds a threshold level. Relatively large transmit power may mean that the probability of failure of the RA procedure used is relatively high. Accordingly, since the probability of failure in RA procedure is high, the electronic device 101 may reduce current consumption as it operates in the second mode.

In one example, the electronic device 101 may determine to switch to the second mode based on the size of the data to be transmitted and/or received, for the measurement object for SCG addition. For example, when the size of the data to be transmitted and/or received is less than a threshold size, the electronic device 101 may determine to switch to the second mode. When the size of the data to be transmitted and/or received is relatively small, the utility of operating as DC by adding an SCG may not be high. For example, if the size of the data to be transmitted is smaller than an uplink split threshold in the state of the DC, the electronic device 101 transmits data only through a primary path, of the primary path and a secondary path configured by the DC, as defined in the standard. As such, when the size of data is relatively small, only one base station may be used for data transmission/reception even in the DC state. Accordingly, when the size of the data to be transmitted and/or received is less than the threshold size, the electronic device 101 may determine to switch to the second mode.

As an example, the electronic device 101 may determine to switch to the second mode based on the battery level. For example, when the battery level is less than a threshold level, the electronic device 101 may determine to switch to the second mode. Alternatively, the electronic device 101 may determine to switch to the antenna mode based on the measured temperature of the electronic device 101. For example, when the measured temperature exceeds a threshold temperature, the electronic device 101 may determine to switch to the second mode.

The electronic device 101 may determine whether to switch from the first mode to the second mode not only by various examples described above, but also by considering a combination of two or more of the above-described examples described above.

Figure 7C:
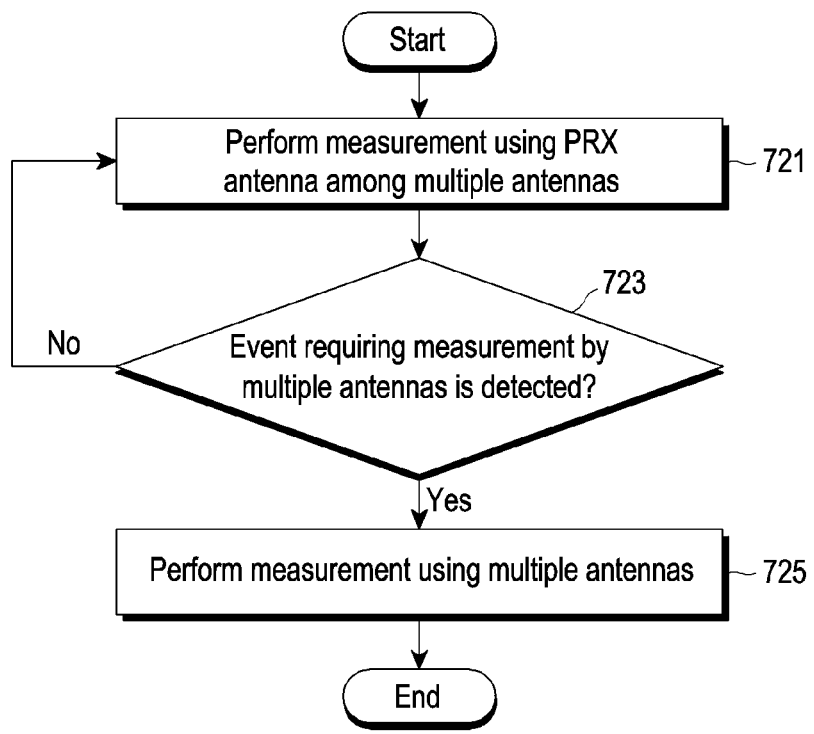
FIG. 7C is a flowchart illustrating an operation method of an electronic device according to various embodiments of the present disclosure.

FIG. 7C is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may perform measurement using one antenna (e.g., PRX antenna) in operation 721. For example, the electronic device 101 may set the second mode as a default mode. Alternatively, the electronic device 101 may switch to the second mode before performing operation 721. An event for switching to the second mode has been described above with reference to FIG. 7b and no description thereof is given below.

According to various embodiments, in operation 723, the electronic device 101 may determine whether an event where measurement by a plurality of antennas is required is detected. If the event is not detected (No in 723), the electronic device 101 may perform measurement in the second mode. If the event is detected (Yes in 723), the electronic device 101 may perform measurement using all (or some) of the plurality of antennas in operation 725. For example, the electronic device 101 may perform measurement in the first mode. The electronic device 101 may identify the maximum value of the measurement results individually corresponding to, e.g., the plurality of antennas and, if the maximum value meets a reporting criterion (e.g., the reporting criterion of the B1 event), may perform measurement reporting. Meanwhile, determining whether the reporting criterion is met using the maximum value of the measurement results is merely an example, and there is no limitation to determining whether the reporting criterion is met using at least some of the measurement results.

In one example, the electronic device 101 may identify whether an event requiring a switch to the first mode based on the measurement result using one antenna occurs, based on the second mode. For example, the electronic device 101 may determine that the event occurs based on identifying that the measurement result measured based on one antenna exceeds a second threshold. For example, the second threshold may be set based on a threshold set for the reporting criterion of the B1 event. The second threshold may differ from the first threshold described in connection with FIG. 7B but, in some cases, may be set to be equal to the first threshold. For example, if Equation 3 is met, the electronic device 101 may switch to the second mode.

$$Mn > \text{Thresh-margin} \qquad \text{[Equation 3]}$$

Here, Mn may be the measurement result for one antenna. Thresh may be the threshold parameter in Equation 1. Margin is a value that may be determined experimentally, and may be a fixed value but, may be variable according to implementation. Alternatively, the electronic device 101 may switch to the first mode when the result of applying the offsets Ofn, Ocn, and Hys to Mn is larger than Threshold-margin. Accordingly, while the probability that the reporting criterion of the B1 event is to be triggered is high, the electronic device 101 may switch from the second mode to the first mode so that the probability of triggering of the reporting criterion of the B1 event may increase.

In one example, the electronic device 101 may identify whether an event requiring a switch to the first mode based on the measurement result using one antenna occurs, based on the second mode during a designated period. For example, the electronic device 101 may identify the maximum value among the measurement results using one antenna during the designated period. The electronic device 101 may determine that the event occurs based on identifying that the maximum value (or a value resultant from setting the offsets set under the reporting criterion of the B1 event to the maximum value) exceeds a first threshold. Since the first threshold has been described above, no further detailed description thereof is given below.

In one example, the electronic device 101 may determine whether to switch to the first mode based on a change in cell identification information while operating in the second mode. For example, in the context where the electronic device 101 moves, at least some of serving cell identification information, target cell identification information, or neighbor cell identification information may be varied. For example, if a handover occurs as the electronic device 101 moves, at least some of the identification information, target cell identification information, or neighbor cell identification information may be varied. Since the likelihood that the electric field is changed is high in the context where the electronic device 101 moves, the electronic device 101 may increase the probability of triggering of the reporting criterion of the B1 event by operating in the first mode. Alternatively, the electronic device 101 may identify information associated with movement based on at least one of an acceleration sensor, a gyro sensor, or a geomagnetic sensor and determine whether to switch to the first mode based on the movement-associated information. Meanwhile, the electronic device 101 may be implemented to determine whether to switch to the second mode based on movement information if it operates in the first mode.

In one example, the electronic device 101 may determine to switch to the first mode based on the size of the data to be transmitted and/or received, for the measurement object for SCG addition. For example, when the size of the data to be transmitted and/or received exceeds a threshold size, the electronic device 101 may determine to switch to the first mode. When the size of the data to be transmitted and/or received is large, the utility of operating as DC by adding an SCG may be high. For example, if the size of the data to be transmitted is larger than an uplink split threshold in the state of the DC, the electronic device 101 transmits data only through both a primary path and a secondary path configured by the DC, as defined in the standard. As such, when the size of data is relatively large, both the base stations may be used for data transmission/reception in the DC state. Accordingly, when the size of the data to be transmitted and/or received exceeds the threshold size, the electronic device 101 may determine to switch to the first mode.

As an example, the electronic device 101 may determine to switch to the second mode based on the battery level. For example, when the battery level exceeds a threshold level, the electronic device 101 may determine to switch to the first mode. Alternatively, the electronic device 101 may determine to switch to the antenna mode based on the measured temperature of the electronic device 101. For example, when the measured temperature is less than a threshold temperature, the electronic device 101 may determine to switch to the first mode.

The electronic device 101 may determine whether to switch from the second mode to the first mode not only by various examples described above, but also by considering a combination of two or more of the above-described examples described above.

Figure 8:
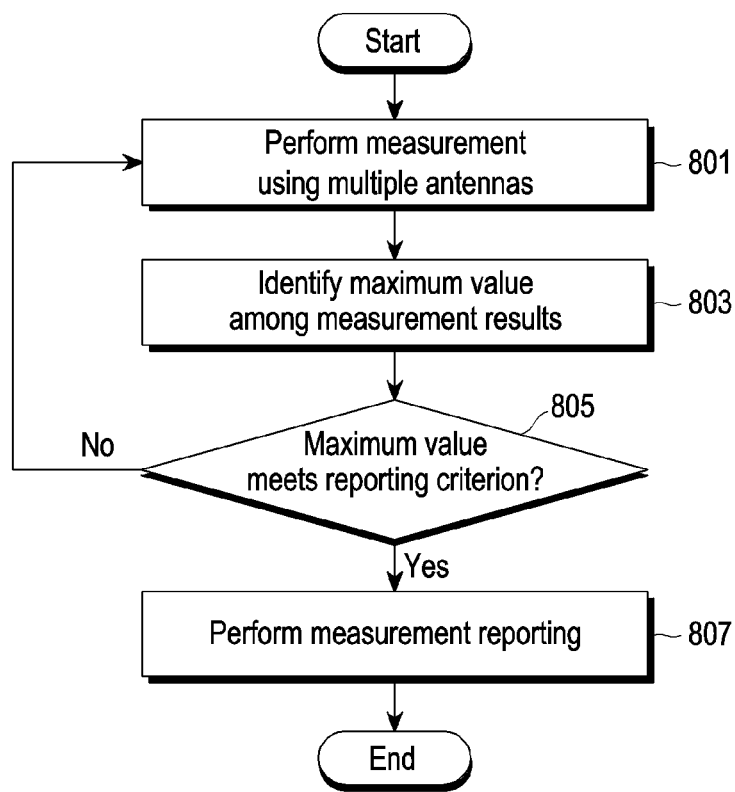
FIG. 8 is a flowchart illustrating an operation method of an electronic device according to various embodiments of the present disclosure.

FIG. 8 is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may perform measurement using a plurality of antennas in operation 801. As described above, there is no limitation to schemes in which the electronic device 101 selects a plurality of antennas.

According to various embodiments, in operation 803, the electronic device 101 may identify a maximum value among measurement results. In operation 805, the electronic device 101 may determine whether the maximum value meets a reporting criterion. When the reporting criterion is not met (No in 805), the electronic device 101 may repeatedly perform measurement using the plurality of antennas according to, e.g., a measurement gap. If the maximum value meets the reporting criterion (Yes in 805), the electronic device 101 may perform measurement reporting in operation 807.

Meanwhile, as in FIG. 8, determining whether the reporting criterion is met using the maximum value among measurement results for the plurality of antennas is merely an example. In one example, the electronic device 101 may perform computation on at least some of the plurality of antennas, and it may determine whether the reporting criterion is met using the result of the computation. Alternatively, the electronic device 101 may use any one of the plurality of measurement results corresponding to the plurality of antennas and may use a criterion other than whether it is the maximum value. For example, when the difference between the measurement result for the PRX antenna and the maximum value among the remaining antennas is less than a threshold, the electronic device 101 may determine whether the reporting criterion is met using the maximum value. When the difference between the measurement result for the PRX antenna and the maximum value among the remaining antennas exceeds the threshold, the electronic device 101 may determine whether the reporting criterion is met using the measurement result for the PRX antenna. Accordingly, the probability of failure of the RA procedure when the difference between PRX antenna and DRX antenna is large may be decreased as described above.

Figure 9:
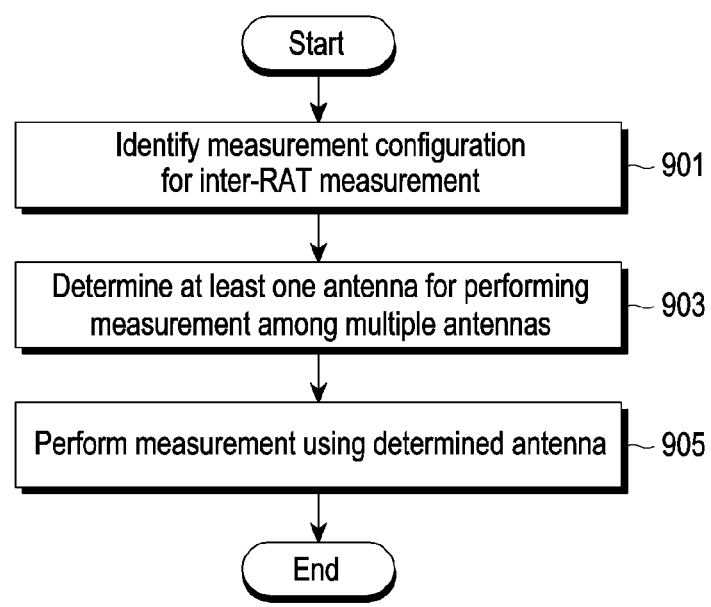
FIG. 9 is a flowchart illustrating an operation method of an electronic device according to various embodiments of the present disclosure.

FIG. 9 is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may identify a channel measurement configuration for inter-RAT measurement in operation 901. In operation 903, the electronic device 101 may determine at least one antenna for performing measurement among the plurality of antennas. For example, if the channel measurement configuration of inter-RAT is first identified, the electronic device 101 may select a default antenna. For example, while the measurement of inter-RAT is performed, the electronic device 101 may select at least one antenna for performing measurement based on at least one measurement result identified immediately before. For example, while the measurement of inter-RAT is performed, the electronic device 101 mays select at least one antenna for performing measurement based on at least one measurement result identified during a preset period. For example, if at least one measurement result previously identified is determined to be a relatively weak electric field, the electronic device 101 may select relatively fewer antennas and, if the at least one pre-identified measurement result is determined to be a relatively strong electric field, the electronic device 101 may select relatively more antennas. For example, the electronic device 101 may set an antenna for measurement based on whether the RA procedure fails and/or the number of RA failures for the corresponding measurement object. For example, the electronic device 101 may set the antenna for measurement based on the magnitude of transmit power corresponding to the RACH. For example, the electronic device 101 may set the antenna for measurement based on the size of the data to be transmitted and/or received. For example, the electronic device 101 may set the antenna for measurement based on at least one of the measured temperature, battery level, or sensing data from at least one sensor for sensing movement. For example, the electronic device 101 may set the antenna for measurement based on whether the identified cell identification information (e.g., serving cell identification information, target cell identification information, and/or neighbor cell identification information) is varied. In operation 905, the electronic device 101 may perform measurement using the determined antenna.

Figure 10A:
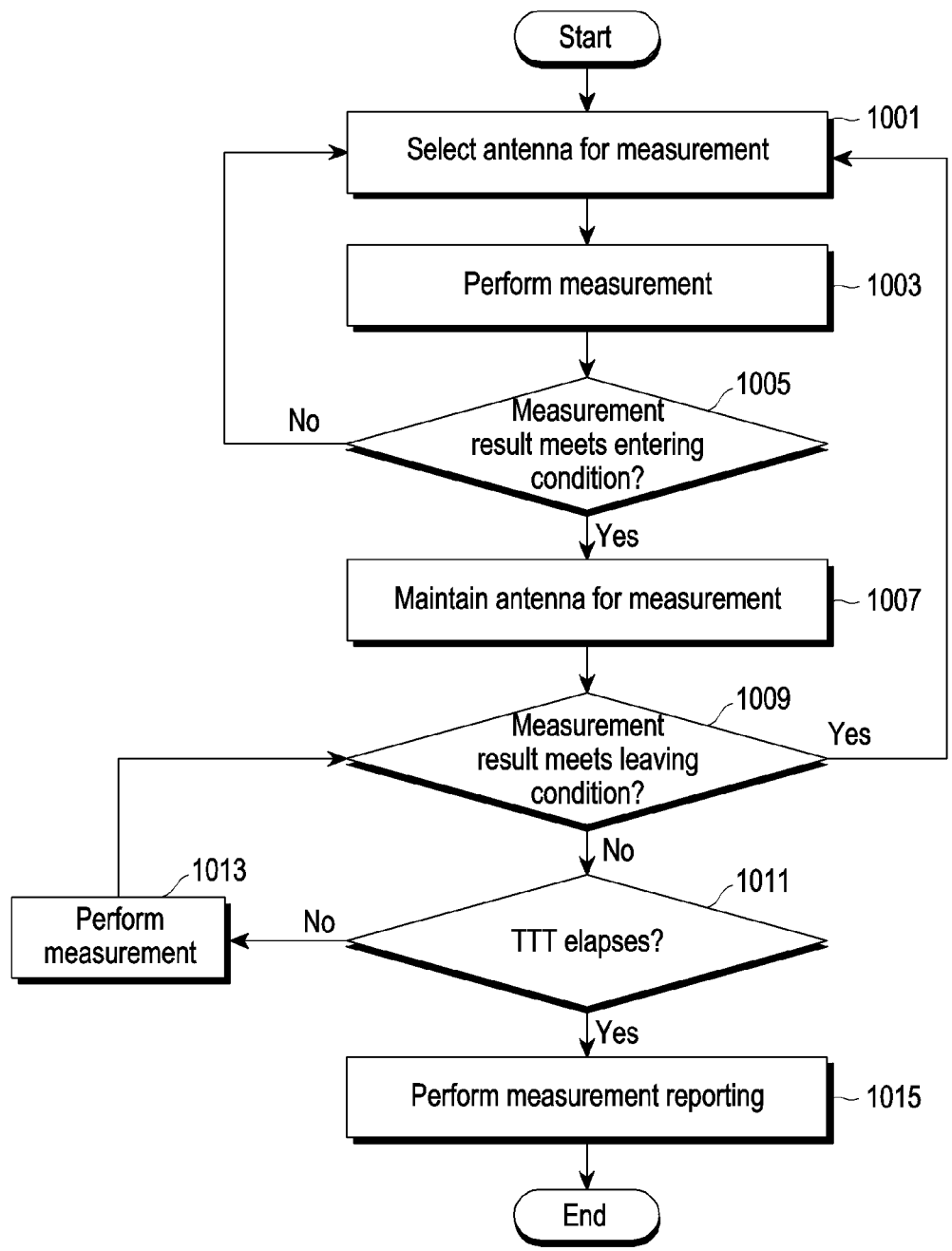
FIG. 10A is a flowchart illustrating an operation method of an electronic device according to various embodiments of the present disclosure.
Figure 10B:
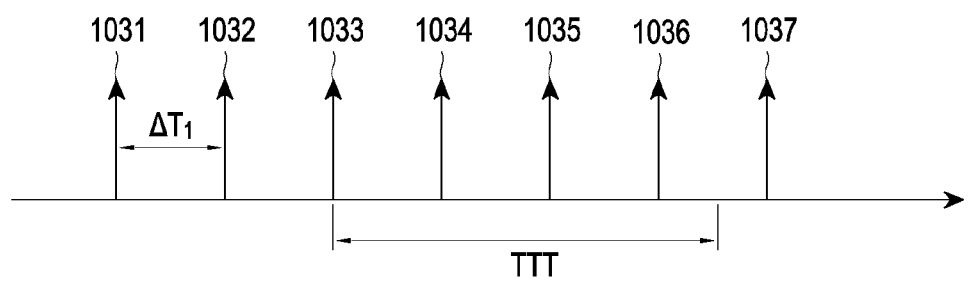
FIG. 10B is a view illustrating a result of measurement over time according to various embodiments of the present disclosure.

FIG. 10A is a flowchart illustrating an operation method of an electronic device according to various embodiments of the present disclosure. The embodiment of FIG. 10A is described with reference to FIG. 10B. FIG. 10B is a view illustrating a result of measurement over time according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may select an antenna for measurement in operation 1001. Various selection schemes have been described above, and no further description thereof is given below. In operation 1003, the electronic device 101 may perform measurement using the selected antenna for measurement. In operation 1005, the electronic device 101 may determine whether the measurement result meets an entering condition If the entering condition is not met (No in 1005), the electronic device 101 may repeatedly perform determination of an antenna for measurement and/or measurement. For example, referring to FIG. 10B, the electronic device 101 may obtain measurement results 1031, 1032, and 1033 based on at least one antenna every period ($\Delta T1$) (e.g., measurement gap) set by the network. If the electronic device 101 may perform measurement using one antenna, each measurement result 1031, 1032, and 1033 may be a measurement result measured according to the period. If the electronic device 101 may perform measurement using a plurality of antennas, the measurement results 1031, 1032, and 1033 may mean a maximum value or values according to the results of computation. The electronic device 101 may identify that the measurement result 1033 meets the entering condition of the reporting criterion of the B1 event.

According to various embodiments, if the entering condition is met (Yes in 1005), the electronic device 101 may maintain the antenna for measurement in operation 1007. The electronic device 101 may initiate the time-to-trigger (TTT) as the entering condition is met. In operation 1009, the electronic device 101 may determine whether the measurement result meets the leaving condition. If the measurement result does not meet the leaving condition (No in 1009), the electronic device 101 may determine whether the TTT elapses in operation 1011. If the TTT does not elapse (No in 1011), the electronic device 101 may perform measurement again in operation 1013. For example, as shown in FIG. 10B, the electronic device 101 may obtain measurement results 1034, 1035, 1036, and 1037 while maintaining the antenna for measurement. If the TTT elapses (Yes in 1011), the electronic device 101 may perform measurement reporting in operation 1015. If the measurement result meets the leaving condition (Yes in 1009), the electronic device 101 may perform measurement again, and the antenna for measurement may be changed.

Figure 11:
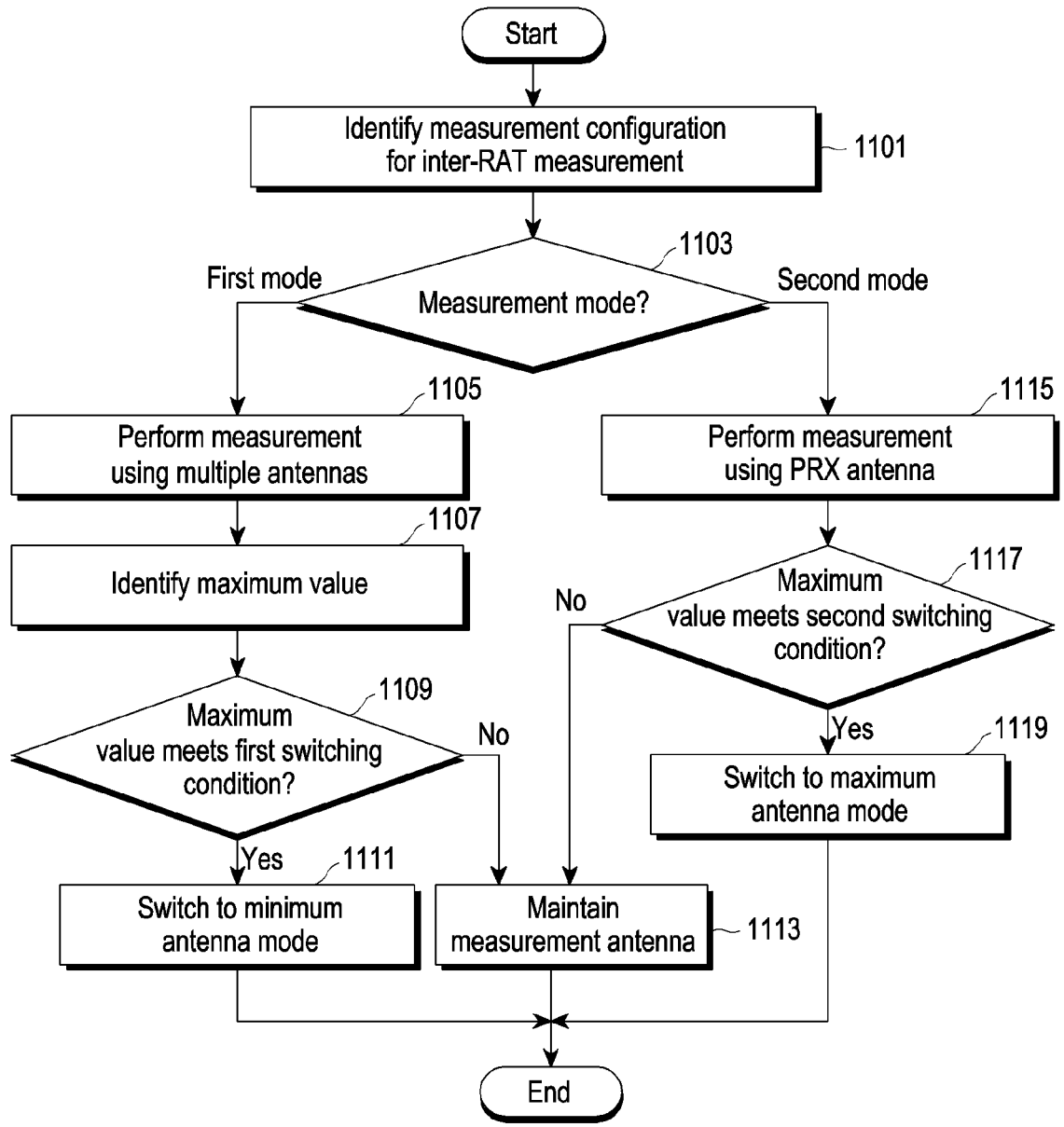
FIG. 11 is a flowchart illustrating an operation method of an electronic device according to various embodiments of the present disclosure.

FIG. 11 is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may identify a channel measurement configuration for inter-RAT measurement in operation 1101. In operation 1103, the electronic device 101 may identify the measurement mode. Identification of the measurement mode and/or switch from the existing measurement mode to a new measurement mode has been described above, and no further description thereof is given below.

In the first mode, the electronic device 101 may perform measurement, e.g., in the first mode, using a plurality of antennas. In operation 1107, the electronic device 101 may identify the maximum value among the measurement results individually corresponding to the plurality of antennas. In operation 1109, the electronic device 101 may determine whether the maximum value meets a first switching condition. Here, the first switching condition is a condition triggering a switch to the second mode and may be substantially the same as that described in connection with FIG. 7B. If the first switching condition is met (Yes in 1109), the electronic device 101 may switch to the second mode in operation 1111 and perform measurement using one antenna (e.g., PRX antenna). If the first switching condition is not met (No in 1109), the electronic device 101 may maintain the measurement antenna in operation 1113. In the second mode, the electronic device 101 may perform measurement in the second mode, using one antenna, e.g., the PRX antenna, in operation 1115. In operation 1117, the electronic device 101 may determine whether the measurement result meets a second switching condition. The second switching condition is a condition triggering a switch to the first mode and may be substantially the same as that described in connection with FIG. 7C. If the second switching condition is met (Yes in 1117), the electronic device 101 may switch to the first mode in operation 1119 and perform measurement using a plurality of antennas (e.g., all (or some) of the antennas for reception). If the second switching condition is not met (No in 1117), the electronic device 101 may maintain the measurement antenna in operation 1113.

Figure 12:
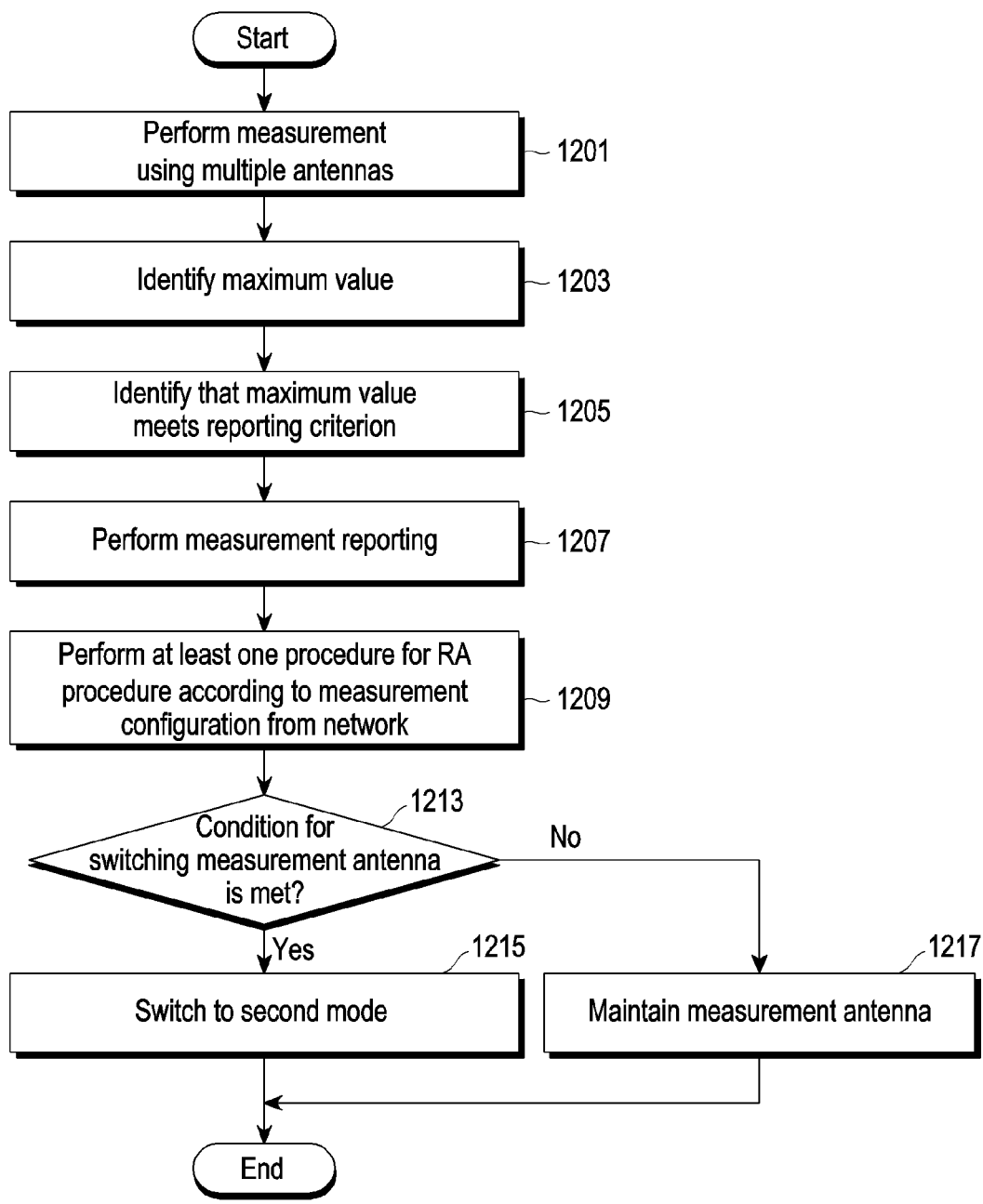
FIG. 12 is a flowchart illustrating an operation method of an electronic device according to various embodiments of the present disclosure.

FIG. 12 is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may perform measurement, e.g., in the first mode, using a plurality of antennas in operation 1201. In operation 1203, the electronic device 101 may identify the maximum value among the measurement results individually corresponding to the plurality of antennas. In operation 1205, the electronic device 101 may identify whether the maximum value meets the reporting criterion. In operation 1207, the electronic device 101 may perform measurement reporting based on the meeting of the reporting criterion. In operation 1209, the electronic device 101 may perform at least one procedure for an RA procedure according to the channel measurement configuration from the network. In operation 1211, the electronic device 101 may identify an RA failure in operation 1211. For example, the electronic device 101 may identify a failure in reception of MSG 2 and/or MSG 4.

According to various embodiments, the electronic device 101 may determine whether a switching condition for the measurement antenna is met based on the RA failure in operation 1213. For example, the electronic device 101 may determine whether the accumulated number of RA failures exceeds a threshold number as whether the switching condition for the measurement antenna is met. Alternatively, the electronic device may determine whether the measurement result in the PRX antenna is smaller than the maximum value among the measurement results for the plurality of antennas and the accumulated number of RA failures exceeds the threshold number as whether the switching condition for the measurement antenna is met. For example, the electronic device 101 may be implemented to determine whether the measurement result in the PRX antenna when downlink and uplink are TDD is smaller than the maximum value among the measurement results for the plurality of antennas, but is not limited thereto. When the switching condition for the measurement antenna is met (Yes in 1213), the electronic device 101 may switch to the second mode in operation 1215. If the switching condition for the measurement antenna is not met (No in 1213), the electronic device 101 may maintain the measurement antenna in operation 1217.

Figure 13:
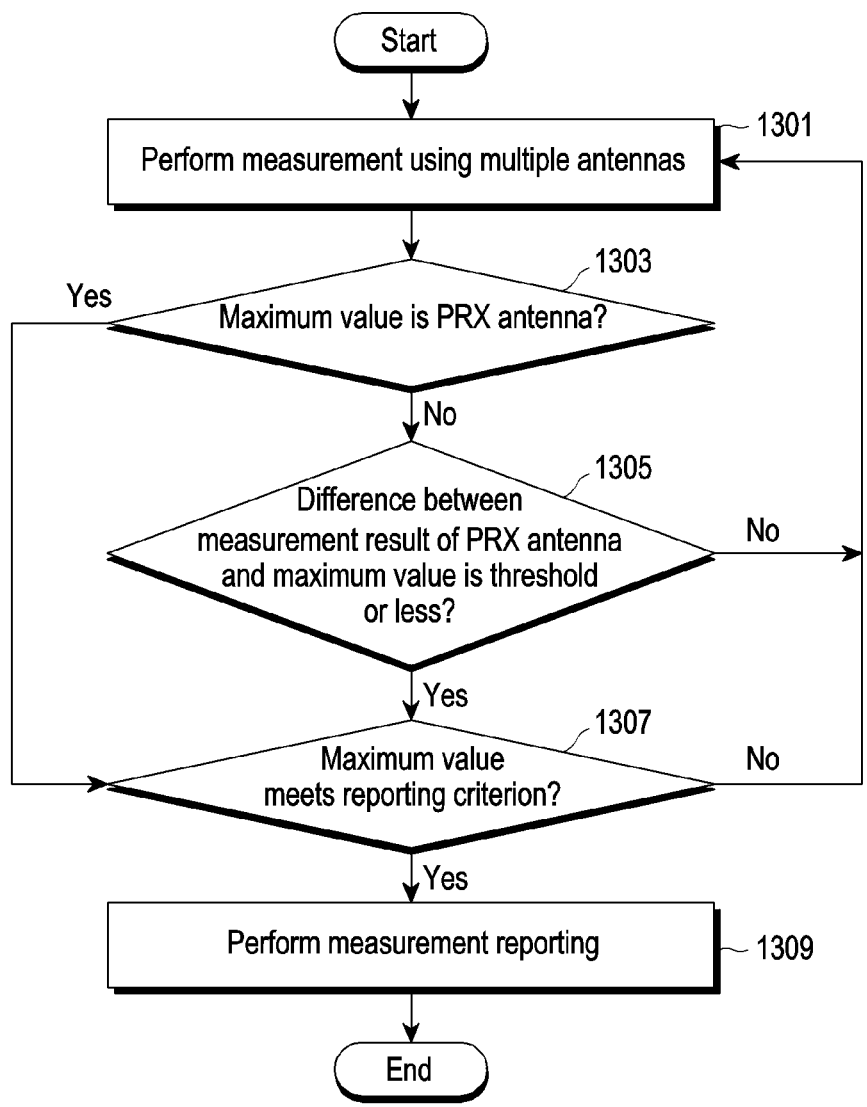
FIG. 13 is a flowchart illustrating an operation method of an electronic device according to various embodiments of the present disclosure.

FIG. 13 is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may perform measurement using a plurality of antennas in operation 1301. In operation 1303, the electronic device 101 may determine whether the maximum value among the measurement results individually corresponding to the plurality of antennas is the measurement result in the PRX antenna. If the maximum value is the measurement result in the PRX antenna (Yes in 1303), the electronic device 101 may determine whether the maximum value meets the reporting criterion in operation 1307. If the maximum value meets the reporting criterion (Yes in 1307), the electronic device 101 may perform measurement reporting in operation 1309.

According to various embodiments, if the maximum value is not the measurement result in the PRX antenna (No in 1303), the electronic device 101 may determine whether the difference between the measurement result in the PRX antenna and the maximum value is a threshold or less in operation 1305. If the difference between the measurement result in the PRX antenna and the maximum value is the threshold or less (Yes in 1305), the electronic device 101 may determine whether the maximum value meets the reporting criterion in operation 1307. If the maximum value meets the reporting criterion (Yes in 1307), the electronic device 101 may perform measurement reporting in operation 1309. If the maximum value does not meet the reporting criterion (No in 1307), the electronic device 101 may perform measurement using the plurality of antennas. If the difference between the measurement result in the PRX antenna and the maximum value exceeds the threshold (No in 1305), the electronic device 101 may perform measurement using the plurality of antennas without performing RA. The instant embodiment may be performed, e.g., when downlink and uplink are TDD but, without limited thereto, the instant example is applicable in the case of TDD.

Figure 14:
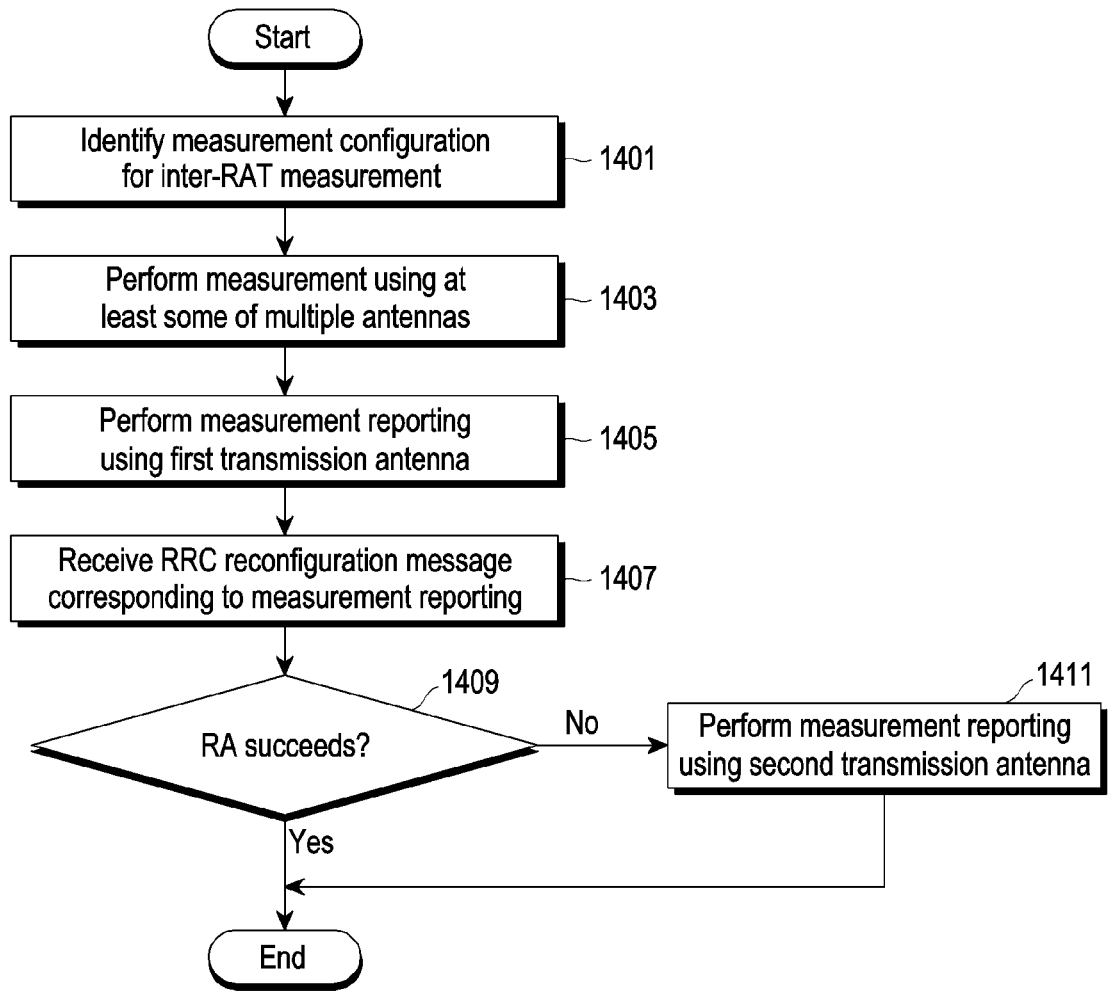
FIG. 14 is a flowchart illustrating an operation method of an electronic device according to various embodiments of the present disclosure.

FIG. 14 is a flowchart illustrating an operation method of an electronic device according to various embodiments of the present disclosure.

According to various embodiments, the communication processor 520 (e.g., at least one of the first communication processor 212, the second communication processor 214, the integrated communication processor 260, or the communication processor 520) of the electronic device (e.g., the electronic device 101 of FIG. 1) may identify a channel measurement configuration for inter-RAT measurement in operation 1401. In operation 1403, the electronic device 101 may perform measurement using at least some of the plurality of antennas. The electronic device 101 may identify that a value based on the measurement result on at least some meets the reporting criterion. In operation 1405, the electronic device 101 may perform measurement reporting using a first transmission antenna. The network may transmit an RRC reconfiguration message to the electronic device 101 in response to the measurement reporting. In operation 1407, the electronic device 101 may receive the RRC reconfiguration message corresponding to the measurement reporting. The electronic device 101 may attempt an RA procedure based on information included in the RRC reconfiguration message. In operation 1409, the electronic device 101 may determine whether the RA succeeds. If the RA succeeds (Yes in 1409), the electronic device 101 may connect to another base station and provide a service. When the RA fails (No in 1409), the electronic device 101 may perform measurement reporting using a second transmission antenna in operation 1411. For example, the electronic device 101 may include two or more transmission RF paths, and the electronic device 101 may select the transmission RF path, different from the existing transmission RF path through which the RA has been attempted, based on the RA failure, and re-attempt an RA procedure. In one example, the electronic device 101 may determine the priority of the antenna for the RA procedure based on the respective measurement results of the plurality of PRX antennas but is not limited thereto. In another example, the electronic device 101 may be configured to attempt an RA procedure using a main transmission antenna set as default and then, as the RA fails, attempt an RA procedure using another transmission antenna.

According to various embodiments, an electronic device (e.g., the electronic device 101) may comprise a plurality of antennas (e.g., the antennas 541, 542, 543, and 544), at least one processor (e.g., at least one of the processor 120, the first communication processor 212, the second communication processor 214, the integrated communication processor 260, or the communication processor 520), and an RF circuit (e.g., the RF circuit 570) configured to process an RF signal output from at least some of the plurality of antennas and provide the processed RF signal to the at least one processor. The at least one processor may be configured to identify at least one channel measurement configuration associated with a second RAT different from a first RAT in a state in which the electronic device is connected to a first communication network based on the first RAT, control the RF circuit to perform measurement on at least one measurement object identified based on at least some of the at least one channel measurement configuration, using at least one first antenna among the plurality of antennas, detect an event requiring a switch of an antenna for performing the measurement on the at least one measurement object, and control the RF circuit to perform the measurement on the at least one measurement object, using at least one second antenna at least partially different from the at least one first antenna among the plurality of antennas, based on detection of the event.

According to various embodiments, the at least one processor may be configured to, as at least part of the controlling the RF circuit to perform the measurement on the at least one measurement object, using the at least one first antenna among the plurality of antennas, control the RF circuit to perform the measurement using entire antennas in the plurality of antennas configured to measure the at least one measurement object included in a measure config which is the channel measurement configuration, and as at least part of the controlling the RF circuit to perform the measurement on the at least one measurement object, using the at least one second antenna among the plurality of antennas, based on detection of the event, control the RF circuit to perform the measurement on the at least one measurement object using a PRX antenna among the plurality of antennas.

According to various embodiments, the at least one processor may be configured to, as at least part of the detecting the event requiring the switch of the antenna for performing the measurement, identify a first value based on measurement results using entire antennas in the plurality of antennas, and identify that the event is detected, based on the first value being less than a first threshold.

According to various embodiments, the at least one processor may be configured to, as at least part of the identifying the first value based on the measurement results using entire antennas in the plurality of antennas, identify a maximum value among the measurement results using entire antennas in the plurality of antennas that is lastly identified as the first value.

According to various embodiments, the at least one processor may be configured to, as at least part of the identifying the first value based on the measurement results using all of the plurality of antennas, identify a maximum value among the measurement results using entire antennas in the plurality of antennas during a past first period as the first value.

According to various embodiments, the at least one processor may be configured to, as at least part of the identifying at least one channel measurement configuration associated with the second RAT, perform measurement reporting on the at least one measurement object before the event is detected and receive an RRC reconfiguration message corresponding to the measurement reporting, as at least part of the detecting the event requiring the switch of the antenna for performing the measurement, attempt a random access (RA) procedure, based on information included in the RRC reconfiguration message, and identify that the event is detected, based on identifying failure of the RA procedure.

According to various embodiments, the at least one processor may be configured to, as at least part of the identifying that the event is detected, based on identifying the failure of the RA procedure, identify that the event is detected, based on an accumulated number of failures of the RA procedure being greater than or equal to a threshold number.

According to various embodiments, the at least one processor may be configured to, as at least part of the detecting the event requiring the switch of the antenna for performing the measurement, identify that the event is detected, based on a difference between a measurement result of a PRX antenna among the plurality of antennas and a maximum value among measurement results corresponding to the plurality of antennas exceeding a second value.

According to various embodiments, the at least one processor may be configured to, as at least part of the detecting the event requiring the switch of the antenna for performing the measurement, identify that the event is detected, based on a size of data to be transmitted by the electronic device and/or data to be received by the electronic device being less than a threshold size.

According to various embodiments, the at least one processor may be configured to, as at least part of the detecting the event requiring the switch of the antenna for performing the measurement, identify that the event is detected, based on a battery level of the electronic device being less than a threshold level.

According to various embodiments, the at least one processor may be configured to, as at least part of the detecting the event requiring the switch of the antenna for performing the measurement, identify that the event is detected, based on a temperature measured in at least a portion of the electronic device exceeding a threshold temperature.

According to various embodiments, the at least one processor may be configured to, as at least part of the controlling the RF circuit to perform the measurement on the at least one measurement object, using the at least one first antenna among the plurality of antennas, control the RF circuit to perform the measurement on the at least one measurement object using a PRX antenna among the plurality of antennas, and as at least part of the controlling the RF circuit to perform the measurement on the at least one measurement object, using the at least one second antenna among the plurality of antennas, based on detection of the event, control the RF circuit to perform the measurement using entire antennas in the plurality of antennas.

According to various embodiments, the at least one processor may be configured to, as at least part of the detecting the event requiring the switch of the antenna for performing the measurement, identify a first value based on the measurement results using entire antennas in the plurality of antennas, and identify that the event is detected, based on the first value being less than a third threshold.

According to various embodiments, the at least one processor may be configured to, as at least part of the identifying the first value based on the measurement results using entire antennas in the plurality of antennas, identify a maximum value among the measurement results using entire antennas in the plurality of antennas that is lastly identified as the first value.

According to various embodiments, the at least one processor may be configured to, as at least part of the identifying the first value based on the measurement results using entire antennas in the plurality of antennas, identify a maximum value among the measurement results using entire antennas in the plurality of antennas during a past second period as the first value.

According to various embodiments, the at least one processor may be configured to, as at least part of the detecting the event requiring the switch of the antenna for performing the measurement, identify that the event is detected, based on a change in at least one of identification information for a serving cell, identification information for a target cell, or identification information for a neighbor cell identified by the electronic device.

According to various embodiments, the at least one processor may be configured to, as at least part of the detecting the event requiring the switch of the antenna for performing the measurement, identify that the event is detected, based on a size of data to be transmitted by the electronic device and/or data to be received by the electronic device being greater than or equal to a threshold size.

According to various embodiments, the at least one processor may be configured to, as at least part of the detecting the event requiring the switch of the antenna for performing the measurement, identify that the event is detected, based on a battery level of the electronic device being greater than or equal to a threshold level.

According to various embodiments, the at least one processor may be configured to, as at least part of the detecting the event requiring the switch of the antenna for performing the measurement, identify whether the event is detected, based on at least one sensing data associated with a movement of the electronic device.

According to various embodiments, a method for operating an electronic device including a plurality of antennas may comprise identifying at least one channel measurement configuration associated with a second RAT different from a first RAT in a state in which the electronic device is connected to a first communication network based on the first RAT, performing measurement on at least one measurement object identified based on at least some of the at least one channel measurement configuration, using at least one first antenna among the plurality of antennas, detecting an event requiring a switch of an antenna for performing the measurement on the at least one measurement object, and performing the measurement on the at least one measurement object, using at least one second antenna at least partially different from the at least one first antenna among the plurality of antennas, based on detection of the event.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a plurality of antennas;
a radio frequency (RF) circuit;
at least one processor operably coupled to the plurality of antennas and the RF circuit; and
memory storing instructions, wherein the instructions, when executed by the at least one processor individually or collectively, cause the electronic device to:
identify at least one channel measurement configuration associated with a second radio access technology (RAT) that is different from a first RAT, while the electronic device is being connected to a first communication network based on the first RAT,
perform, using a first antenna group among the plurality of antennas, a measurement operation on at least one measurement object identified based on the at least one channel measurement configuration provided by a radio resource control (RRC) reconfiguration message, wherein the first antenna group comprises entire antennas among the plurality of antennas including primary reception (PRX) antennas and diversity reception (DRX) antennas, and
based on identifying that a measurement value corresponding to at least one measurement result using at least one antenna in the first antenna group, being less than a threshold, perform a measurement operation on the at least one measurement object using a second antenna group including a part of the first antenna group.

2. The electronic device of claim 1, wherein the at least one processor is further configured to:
perform the measurement operation on the at least one measurement object using at least one PRX antenna as the second antenna group.

3. The electronic device of claim 1, wherein the at least one processor is further configured to:
identify a first value based on measurement results using the entire antennas in the plurality of antennas as the measurement value.

4. The electronic device of claim 1, wherein the at least one processor is further configured to:
identify a maximum value among measurement results using the entire antennas among the plurality of antennas, the maximum value being lastly identified as the measurement value.

5. The electronic device of claim 1, wherein the at least one processor is further configured to:
identify a maximum value among measurement results using the entire antennas among the plurality of antennas during a past first period, the maximum value being identified as the measurement value.

6. The electronic device of claim 1, wherein the at least one processor is further configured to:
attempt a random access (RA) procedure based on information included in the RRC reconfiguration message; and
based on at least one failure of the RA procedure, detecting that an antenna switching for performing the measurement operation using the second antenna group is required.

7. The electronic device of claim 6, wherein the at least one processor is further configured to:
based on an accumulated number of failures of the RA procedure being greater than or equal to a threshold number, detecting that an antenna switching for performing the measurement operation using the second antenna group is required.

8. The electronic device of claim 1, wherein the at least one processor is further configured to:
based on a difference between a measurement result of at least one PRX antenna and a maximum value among measurement results corresponding to the plurality of antennas exceeding a threshold value, detecting that an antenna switching for performing the measurement operation using the second antenna group is required.

9. The electronic device of claim 1, wherein the at least one processor is further configured to:
based on at least one of a size of data to be transmitted or a size of data to be received by the electronic device being less than a threshold size, detecting that an antenna switching for performing the measurement operation using the second antenna group is required.

10. The electronic device of claim 1, wherein the at least one processor is further configured to:
based on a battery level of the electronic device being less than a threshold level, detecting that an antenna switching for performing the measurement operation using the second antenna group is required.

11. The electronic device of claim 1, wherein the at least one processor is further configured to:
based on a temperature of the electronic device measured by the electronic device exceeding a threshold temperature, detecting that an antenna switching for performing the measurement operation using the second antenna group is required.

12. The electronic device of claim 1, wherein the at least one processor is further configured to:
based on at least one sensing data associated with a movement of the electronic device, detecting that an antenna switching for performing the measurement operation using the second antenna group is required.

13. The electronic device of claim 1, further comprising:
identifying a maximum value among measurement results using the entire antennas among the plurality of antennas as the measurement value.

14. A method performed by an electronic device including a plurality of antennas, the method comprising:
identifying at least one channel measurement configuration associated with a second radio access technology (RAT) that is different from a first RAT, while the electronic device is being connected to a first communication network based on the first RAT;
performing, using a first antenna group among the plurality of antennas, a measurement operation on at least one measurement object identified based on the at least one channel measurement configuration provided by a radio resource control (RRC) reconfiguration message, wherein the first antenna group comprises entire antennas among the plurality of antennas including primary reception (PRX) antennas and diversity reception (DRX) antennas; and
based on identifying that a measurement value corresponding to at least one measurement result using at least one antenna in the first antenna group, being less than a threshold, performing a measurement operation on the at least one measurement object using a second antenna group including a part of the first antenna group.

15. The method of claim 14, wherein the measurement operation on the at least one measurement object using the second antenna group is performed using at least one PRX antenna as the second antenna group.

16. A non-transitory computer readable storage medium storing one or more programs, the one or more programs comprising instructions configured to, when executed by at least one processor of an electronic device including a plurality of antennas, cause the electronic device to:
identify at least one channel measurement configuration associated with a second radio access technology (RAT) that is different from a first RAT, while the electronic device is being connected to a first communication network based on the first RAT;
perform, using a first antenna group among the plurality of antennas, a measurement operation on at least one measurement object identified based on the at least one channel measurement configuration provided by a radio resource control (RRC) reconfiguration message, wherein the first antenna group comprises entire antennas among the plurality of antennas including primary reception (PRX) antennas and diversity reception (DRX) antennas; and
based on identifying that a measurement value corresponding to at least one measurement result using at least one antenna in the first antenna group, being less than a threshold, perform a measurement operation on the at least one measurement object using a second antenna group including a part of the first antenna group.

17. The non-transitory computer readable storage medium of claim 16, wherein the one or more programs comprising instructions configured to, when executed by at least one processor of an electronic device including a plurality of antennas, cause the electronic device to:
perform the measurement operation on the at least one measurement object using at least one PRX antenna as the second antenna group.

18. The non-transitory computer readable storage medium of claim 16, wherein the one or more programs comprising instructions configured to, when executed by at least one processor of an electronic device including a plurality of antennas, cause the electronic device to:
identify a maximum value among measurement results using the entire antennas among the plurality of antennas, as the measurement value.

* * * * *